United States Patent
Japikse

(10) Patent No.: US 12,196,223 B2
(45) Date of Patent: *Jan. 14, 2025

(54) BIASED PASSAGES FOR TURBOMACHINERY

(71) Applicant: Concepts NREC, LLC, White River Junction, VT (US)

(72) Inventor: David Japikse, Woolwich, ME (US)

(73) Assignee: Concepts NREC, LLC, White River Junction, VT (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/390,777

(22) Filed: Dec. 20, 2023

(65) Prior Publication Data

US 2024/0125331 A1    Apr. 18, 2024

Related U.S. Application Data

(63) Continuation of application No. 16/948,318, filed on Sep. 14, 2020, now Pat. No. 11,852,165, which is a
(Continued)

(51) Int. Cl.
*F04D 29/44*     (2006.01)
*F02C 6/12*      (2006.01)
(Continued)

(52) U.S. Cl.
CPC ............ *F04D 29/444* (2013.01); *F02C 6/12* (2013.01); *F04D 17/10* (2013.01);
(Continued)

(58) Field of Classification Search
CPC ...... F04D 29/44; F04D 29/442; F04D 29/444; F04D 29/447; F04D 29/448; F04D 29/462
See application file for complete search history.

(56) References Cited

U.S. PATENT DOCUMENTS

| | | |
|---|---|---|
| 2,967,013 A | 1/1961 | Dallenbach |
| 3,006,603 A | 10/1961 | Caruso et al. |
| (Continued) | | |

FOREIGN PATENT DOCUMENTS

| | | |
|---|---|---|
| DE | 4126907 A1 | 3/1992 |
| EP | 0343888 A2 | 11/1989 |
| (Continued) | | |

OTHER PUBLICATIONS

International Search Report and Written Opinion dated Jul. 27, 2016, in corresponding International Application No. PCT/US2016/030184, filed on Apr. 29, 2016.

*Primary Examiner* — Christopher R Legendre
(74) *Attorney, Agent, or Firm* — Downs Rachlin Martin PLLC

(57) ABSTRACT

Turbomachines having one or more flow guiding features designed to increase the performance of the turbomachine. In some examples, flow guiding features are designed and configured to bias a circumferential pressure distribution at a diffuser inlet toward circumferential uniformity, otherwise account for such low-frequency spatial pressure variations, increase the controllability of spatial flow field variations, or modifying flow field variations, etc. In some examples, a diffuser having a row of vanes that include a plurality of first vanes and at least one second vane having a different characteristic than the first vanes are disclosed. In some examples, diffusers having an aperiodic section including one or more biased passages for biasing a flow field are disclosed. And in some examples, turbomachines having flowwise elongate recesses in one or both of a hub and shroud surface are disclosed.

19 Claims, 43 Drawing Sheets

Related U.S. Application Data continuation of application No. 15/103,252, filed as application No. PCT/US2016/030184 on Apr. 29, 2016, now Pat. No. 10,774,842.

(60) Provisional application No. 62/243,415, filed on Oct. 19, 2015, provisional application No. 62/155,341, filed on Apr. 30, 2015.

(51) Int. Cl.
*F04D 17/10* (2006.01)
*F04D 29/42* (2006.01)
*F04D 29/46* (2006.01)

(52) U.S. Cl.
CPC ....... *F04D 29/4206* (2013.01); *F04D 29/462* (2013.01); *F05D 2250/52* (2013.01); *F05D 2260/961* (2013.01)

(56) References Cited

U.S. PATENT DOCUMENTS

| | | | |
|---|---|---|---|
| 3,162,421 A | 12/1964 | Gottfired | |
| 3,957,392 A | 5/1976 | Blackburn | |
| 4,354,802 A | 10/1982 | Nishida | |
| 4,395,197 A | 7/1983 | Yoshinaga | |
| 4,421,457 A | 12/1983 | Yoshinaga et al. | |
| 4,530,639 A | 7/1985 | Mowill | |
| 4,877,370 A | 10/1989 | Nakagawa | |
| 4,877,373 A | 10/1989 | Bandukwalla | |
| 5,165,849 A | 11/1992 | Nakagawa | |
| 5,316,441 A | 5/1994 | Osborne | |
| 5,529,457 A | 6/1996 | Terasaki et al. | |
| 5,709,531 A | 1/1998 | Nishida et al. | |
| 5,730,580 A | 3/1998 | Japikse | |
| 6,155,779 A | 12/2000 | Watanabe | |
| 6,347,921 B1 | 2/2002 | Watanabe | |
| 8,100,643 B2 | 1/2012 | Leblanc et al. | |
| 8,602,728 B2 | 12/2013 | Swiatek et al. | |
| 8,616,843 B2 | 12/2013 | Shibata | |
| 10,774,842 B2 | 9/2020 | Japikse | |
| 2010/0129204 A1 | 5/2010 | Higashimori | |
| 2013/0094955 A1 | 4/2013 | Ibaraki et al. | |
| 2013/0133156 A1 | 5/2013 | Yokote et al. | |
| 2013/0280060 A1 | 10/2013 | Nasir | |
| 2015/0369073 A1 | 12/2015 | Japikse | |
| 2017/0152861 A1 | 6/2017 | Japikse | |
| 2020/0408222 A1 | 12/2020 | Japikse | |

FOREIGN PATENT DOCUMENTS

| | | |
|---|---|---|
| EP | 0603828 A1 | 6/1994 |
| EP | 0622549 A1 | 11/1994 |
| EP | 0908631 A2 | 4/1999 |
| EP | 2314876 A2 | 4/2011 |
| JP | H09-068192 A | 3/1997 |
| JP | 2007-247621 A | 9/2007 |
| JP | 2011089460 A | 5/2011 |
| WO | 199002265 A1 | 3/1990 |

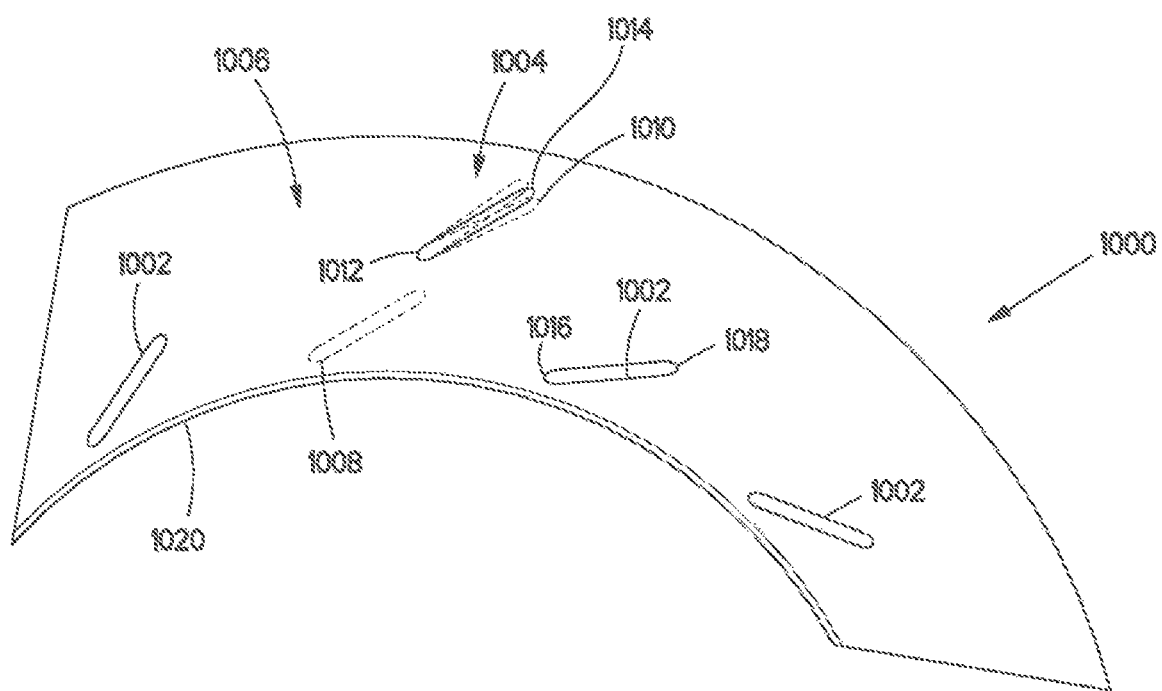
FIG. 10

BIASED PASSAGES FOR TURBOMACHINERY

RELATED APPLICATION DATA

This application is a continuation application of U.S. patent application Ser. No. 16/948,318, filed Sep. 14, 2020, and titled "Biased Passages For Turbomachinery", which application is a continuation application of U.S. patent application Ser. No. 15/103,252, filed Jun. 9, 2016, and titled "Biased Passages For Turbomachinery", now U.S. Pat. No. 10,774,842, which application is a 371 of International Application No. PCT/US16/30184, filed on Apr. 29, 2016, and titled "Biased Passages For Turbomachinery", which application claims the benefit of priority of U.S. Provisional Patent Application Ser. No. 62/155,341, filed Apr. 30, 2015, and titled "Biased Passage(s) Flow Devices For Turbomachinery" and U.S. Provisional Patent Application Ser. No. 62/243,415, filed Oct. 19, 2015, and titled "Methods For Designing Turbomachines To Account For Non-Uniform Pressures At Diffuser Inlet And Associated Structures And Devices". Each of these applications is incorporated by reference herein in its entirety.

FIELD OF THE INVENTION

The present invention generally relates to the field of turbomachinery. In particular, the present invention is directed to biased passages for turbomachinery.

BACKGROUND

A wide variety of diffuser types for centrifugal pump and compressor stages have been employed over the past several decades. In some cases, a good impeller has been designed first, and then a good diffuser is designed next, or the two elements are designed concurrently. Regardless, essentially all past work has been based on the quasi-steady/axisymmetric assumption of diffuser inlet flow which has typically been treated simply as a one-dimensional (1D) velocity triangle model for preliminary design. Much of these assumptions carry over even with computational fluid dynamic (CFD) models used today. It has typically been assumed, at some level, that the flow leaving an impeller, regardless of the number of blades, and then entering the diffuser, again regardless of the number of vanes, is essentially periodic and axisymmetric, and completely and uniformly fills each diffuser passage.

SUMMARY OF THE DISCLOSURE

In one implementation, the present disclosure is directed to a diffuser. The diffuser includes an inlet, a hub, and a shroud; and a row of vanes including a plurality of vane groupings each including a plurality of first partial height vanes affixed to one of the hub and the shroud, and a plurality second partial height vanes circumferentially spaced from the first partial height vane and affixed to the other of the hub and the shroud; wherein adjacent ones of the first and second partial height vanes overlap in a spanwise direction when viewed from a direction perpendicular to the spanwise direction, the spanwise direction being a direction extending between the hub and the shroud.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein:

FIG. 10 shows a flat plate diffuser with a biased passage formed by a second vane having an alternate flowwise location and stagger angle;

DETAILED DESCRIPTION

Aspects of the present disclosure include turbomachines having one or more flow guiding features designed to increase the performance of the turbomachine. In some examples, flow guiding features are designed and configured to bias a circumferential pressure distribution at a diffuser inlet toward circumferential uniformity, or otherwise account for such low-frequency spatial pressure variations. In some examples, a diffuser having a row of vanes that include a plurality of first vanes and at least one second vane having a different characteristic than the first vanes are disclosed. In some examples, diffusers having an aperiodic section including one or more biased passages for biasing a flow field are disclosed. In some examples, turbomachines having flowwise elongate recesses in one or both of a hub and shroud surface are disclosed. As described herein, the present disclosure includes various combinations of flow guiding features that may be incorporated in a turbomachine to account for flow field characteristics, including but not limited to circumferential asymmetries, to thereby improve the performance of the turbomachine.

Figure 1:
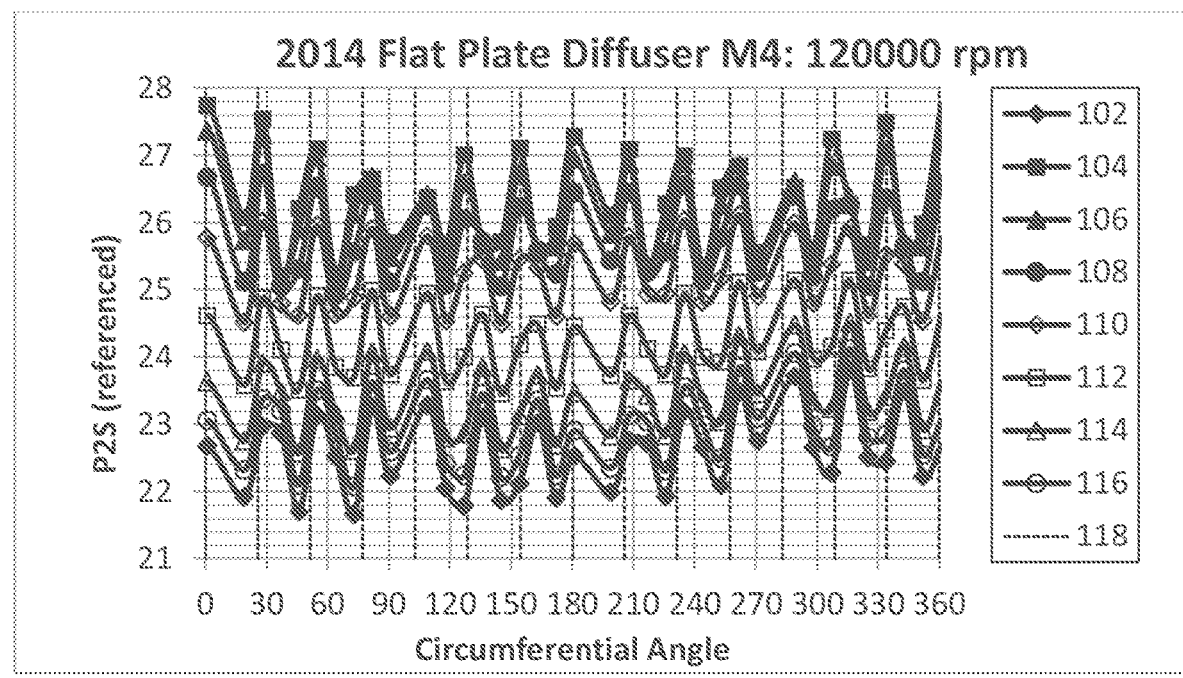
FIG. 1 shows circumferential static pressure measurements at impeller tip/diffuser inlet for a flat plate diffuser operably coupled to a centrifugal compressor impeller operating at 120,000 RPM.
Figure 2:
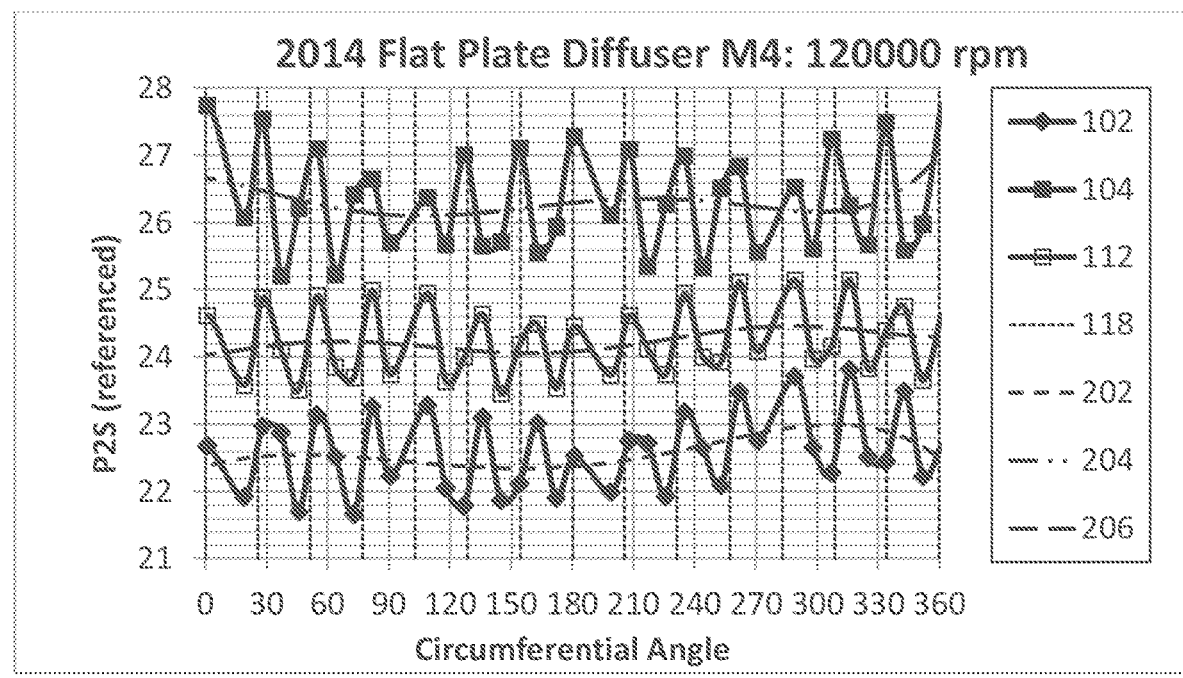
FIG. 2 is a subset of the data from FIG. 1.

FIGS. 1-5 are graphs of static pressure versus circumferential angle for various diffuser types and operating conditions, each of the diffusers operably arranged downstream of a centrifugal compressor. Each of FIGS. 1-5 shows time-averaged static pressure at several circumferential locations around the machines, all at a streamwise location between impeller exit and diffuser inlet. FIG. 1 shows time averaged static pressures for various flowrates 102-116, with curve 104 being the lowest flow rate and 102 the highest, all at the same impeller rotational speed, here 120,000 RPM. The data in FIG. 1 is from a flat plate diffuser having 14 vanes. Vane location lines 118 show the approximate location of each of the vanes with respect to the static pressure measurements. As shown in FIG. 1, each of pressure curves 102-116 has a sawtooth pattern, with peaks corresponding to each vane location 118, such sawtooth pattern being mostly due to the natural vane-to-vane pressure field that exists in vaned diffusers or any cascade of turbomachinery vanes. Thus, the pressure curves 102-116 have a first spatial frequency that is substantially the same as the spatial frequency of the vanes of the flat plate diffuser. Pressure curves 102-116, however, also have a lower-frequency wave type variation superposed on the sawtooth shape, the lower-frequency wave having a primary spatial frequency that is less than the spatial frequency of the vanes. FIG. 2 shows a subset of the pressure curves from FIG. 1—curves 102, 104, and 112. FIG. 2 also includes mean pressure curves 202, 204, and 206, which, in this example, are $6^{th}$ order polynomial curves. The low-frequency spatial variation in time-averaged circumferential static pressure can be seen in the mean pressure curves 202, 204, and 206, in this example, each flow rate resulting in a low-frequency pressure variation with two maxima and two minima around the circumference of the machine.

FIGS. 1 and 2 indicate that, contrary to the common assumption made in turbomachinery design that the time averaged circumferential flow and pressure distribution at the diffuser inlet is substantially axisymmetric, the static pressure in fact varies around the circumference of the machine. In regions where the pressure is high, the velocities may be generally low and vane incidence may be closer to one extreme, e.g., low or high, depending, for example, on phase angle. And in regions where the pressure is low, the velocities may be generally high and vane incidence may be closer to the other extreme, e.g., high or low. Consequently, in regions where the incidence at the diffuser inlet due to this distortion is high, early stall may be more likely and losses may be relatively high. The flow field in these cases may be developing high flow and low flow regions with different pressures in order to pass the asymmetric impeller flow into a fixed number of diffuser passages.

Figure 3:
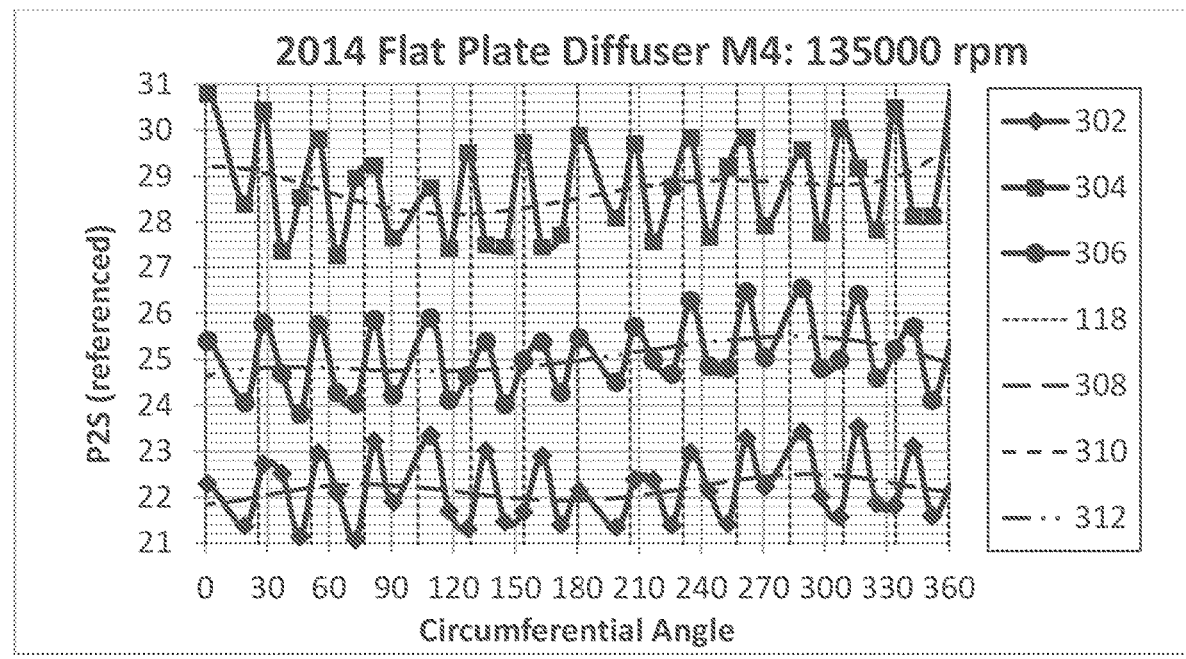
FIG. 3 shows circumferential static pressure measurements for the same machine as FIGS. 1 and 2, but operating at 135,000 RPM.

FIG. 3 shows static pressure test data at three flow rates 302, 304, 306 with the same flat plate diffuser as FIGS. 1 and 2, but with the compressor operating at a different speed, here 135,000 RPM, with curve 304 being the lowest flow rate and 302 the highest. Mean pressure curves 308, 310, and 312 show a similar low-frequency variation as shown in FIG. 2, and also shows a circumferential shift in local maxima and minima as flow rates decrease and the system approaches surge.

Figure 4:
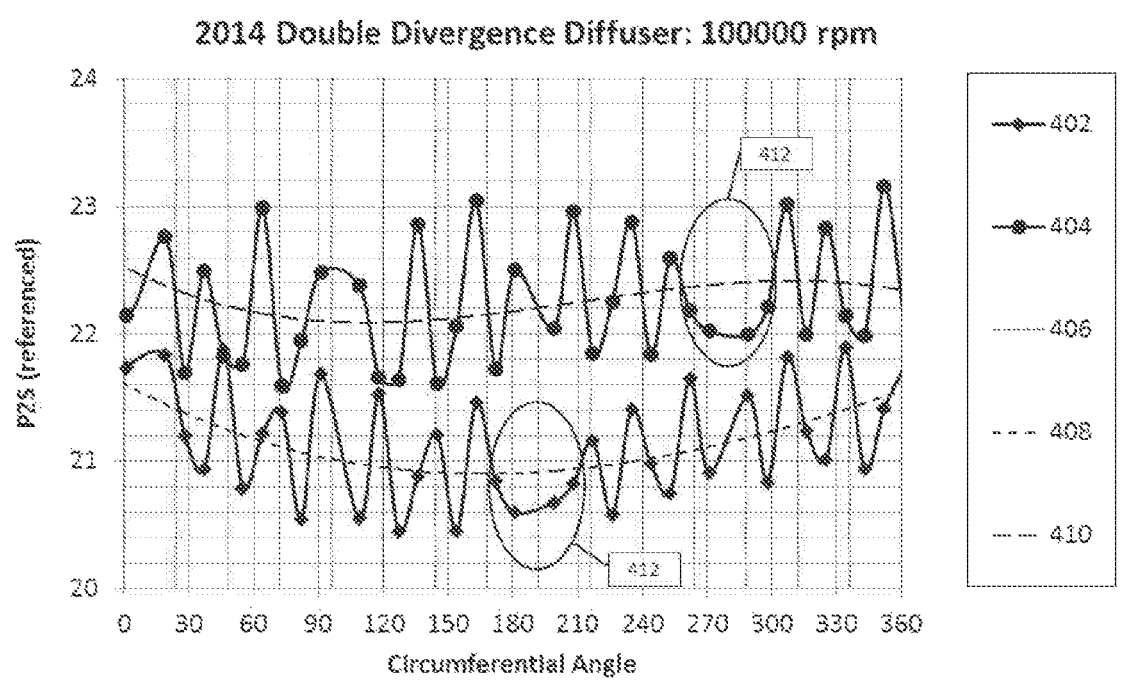
FIG. 4 shows circumferential static pressure measurements for a channel diffuser operably coupled to a centrifugal compressor impeller operating at 100,000 RPM.
Figure 5:
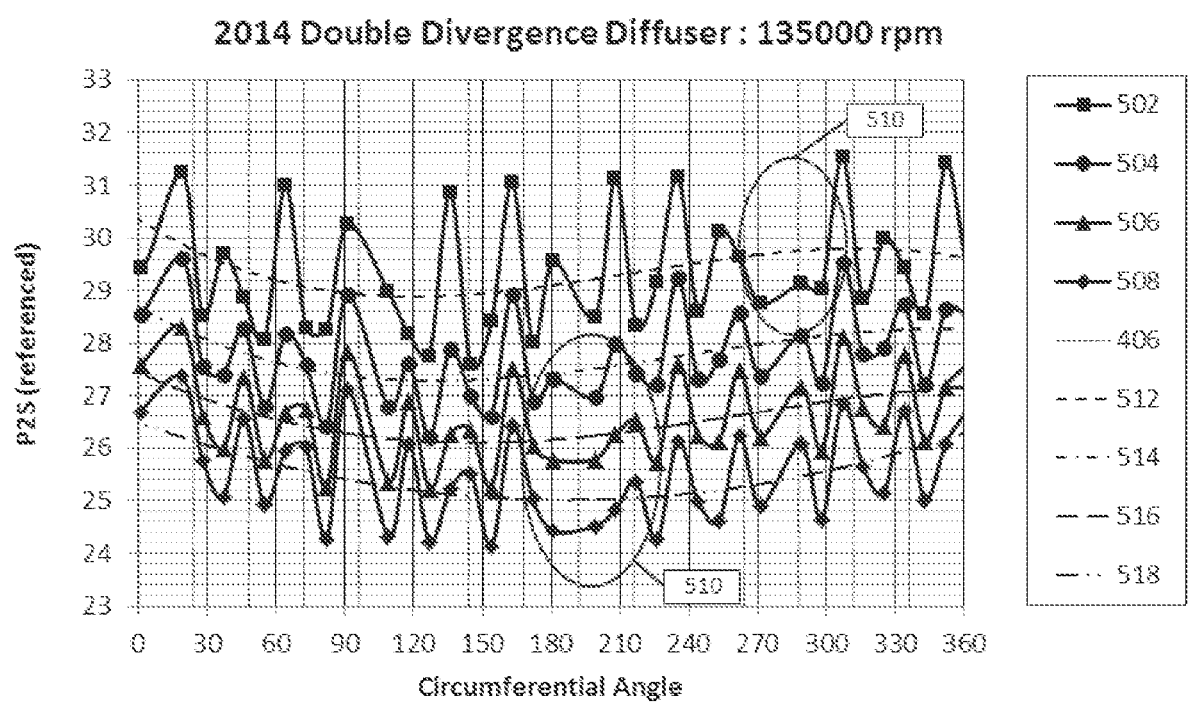
FIG. 5 shows circumferential static pressure measurements for the same machine as FIG. 4, but operating at 135,000 RPM.

FIGS. 4 and 5 similarly show a time-averaged circumferential distribution of static pressure at diffuser inlet for a double-divergence channel diffuser operably coupled to a centrifugal compressor impeller operating at 100,000 RPM (FIG. 4) and 135,000 RPM (FIG. 5). In FIG. 4, pressure curves 402 and 404 and mean pressure curves 408, 410 show a low-frequency circumferential variation having a primary spatial frequency distribution that is less than the spatial frequency distribution of the diffuser channels, as indicated by vane locations 406. Unlike FIGS. 1-3, pressure curves 402 and 404 do not have the same number of higher-frequency local maxima in the sawtooth pattern as the number of vanes at locations 406. Instead, a pocket 412 exists in the data, which shifts with flow rate. Pocket 412 suggests an offset or relief process may be occurring to allow the non-uniform flow to enter the fixed diffuser passages, and indicates potential underperforming diffuser passages, at least in the region of pocket 412. FIG. 5 includes pressure curves 502, 504, 506, and 508 and mean pressure curves 512, 514, 516, and 518 corresponding to four different flow rates, all at 135,000 RPM. As in FIG. 4, pockets 510 appear at each flowrate.

Figure 6:
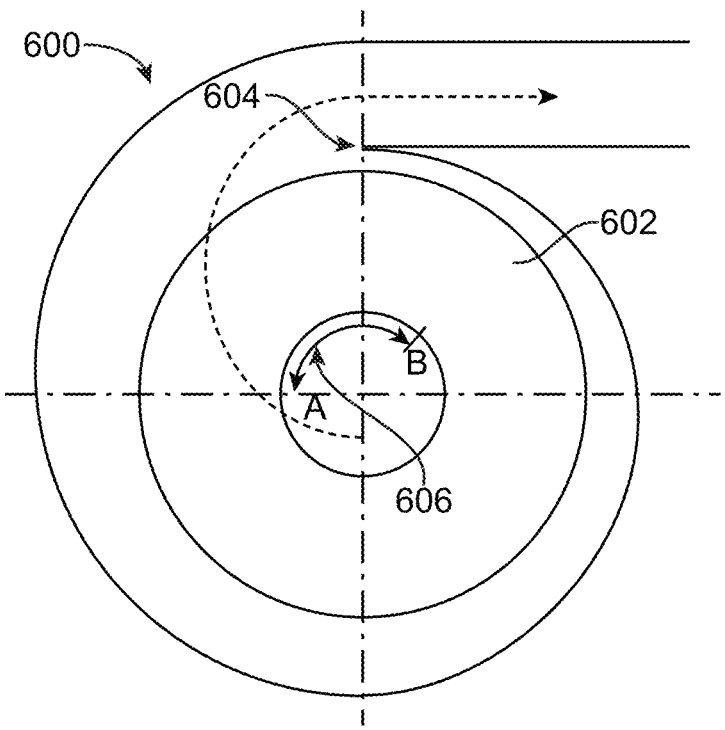
FIG. 6 shows a prior art volute.
Figure 7:
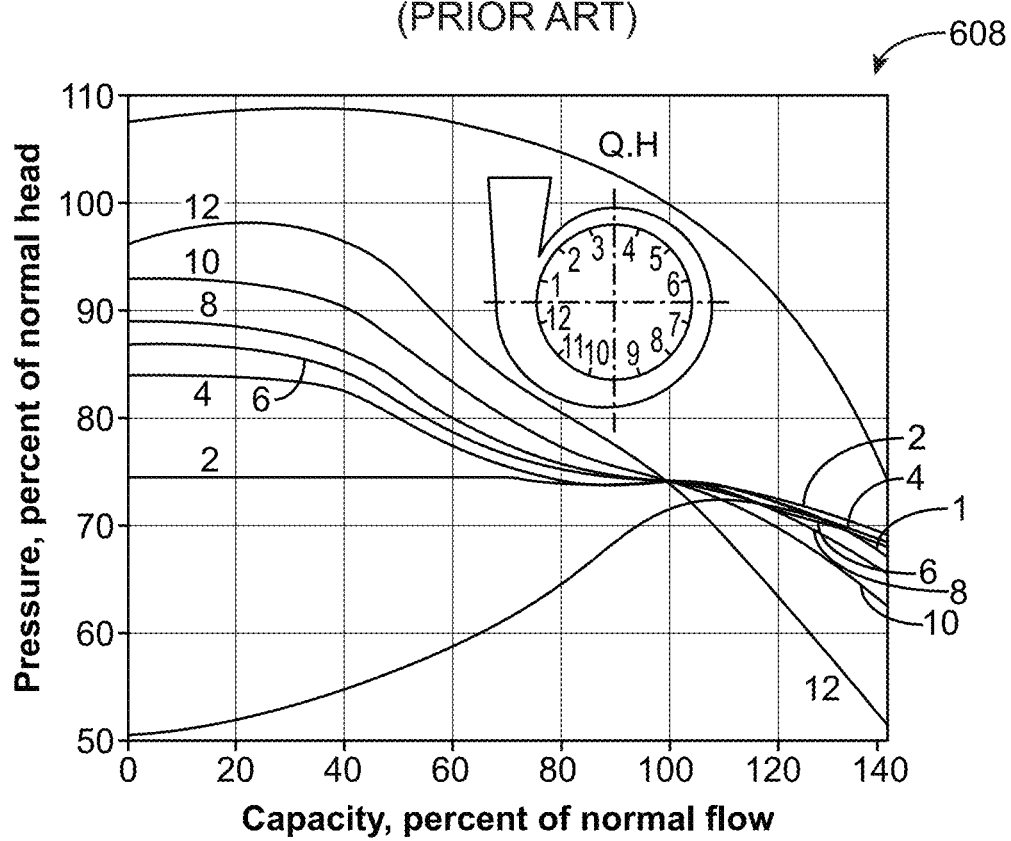
FIG. 7 shows circumferential pressure measurements for a compressor or pump with a downstream volute.

Extensive testing and analysis of circumferential pressure data for various diffuser types have shown that the low-frequency circumferential pressure distribution shown in FIGS. 1-5 do not originate from an asymmetric flow path located upstream or downstream of the diffuser. FIG. 6 shows an example of an asymmetric flow path in the form of a volute 600 located downstream of diffuser 602. It is well known that volutes such as volute 600 create an asymmetry in the flow field of a diffuser, such as diffuser 602, proximate cutwater 604, (also referred to as a volute tongue 604) e.g., creating a volute distortion zone 606 extending between locations A and B. In the illustrated example, volute distortion zone extends from approximately 90 degrees upstream of cutwater 604 (location "A") to approximately 45 degrees downstream of the cutwater (location "B"). FIG. 7 shows circumferential pressure versus flow rate for a compressor or pump having a volute. As shown in FIG. 7, the volute creates strong circumferential distortions in impeller exit pressures at low flows due to strong diffusion in the volute at that condition, which diminishes as flow rate increases and the volute flow state switches from diffusion to acceleration. Pressure curves 1 and 2 in FIG. 7 are in volute distortion zone 606 (FIG. 6).

Various diffuser designs have been developed to improve diffuser performance in machines with asymmetric flow paths such as volutes that try to account for the large circumferential distortions caused by the volute or other asymmetric flow path. Other examples of such asymmetric flow paths located upstream or downstream of the diffuser include a side inlet in front of the impeller, an asymmetric collector, etc. Rather than localized bulk pressure distortions caused by an asymmetric flow path such as a volute, the low frequency pressure variations shown in FIGS. 1-5 extend around the entire circumference of the machine, are an active phenomena that shift in location with operating condition, and exist whether or not asymmetric flow paths are present. The present paper discloses a variety of diffusers having biased passages designed and configured to improve diffuser performance in light of these low-frequency spatial pressure variations. In some embodiments, biased passages are provided that are located, configured, and dimensioned to bias a low-frequency circumferential pressure distribution at a diffuser inlet, such as the low-frequency variations shown in FIGS. 1-5, toward circumferential uniformity. In other examples, biased passages are designed and configured to also, or alternatively, improve the performance of a turbomachine, including increasing the controllability of spatial flow field variations, modifying flow field variations, and improving the performance of the turbomachinery in light of flow field variations.

The present paper includes a variety of diffuser design variables or characteristics that may be combined in any number of different combinations to develop a diffuser with biased passages tailored for particular performance and flow fields. Non-limiting examples of such diffuser design variables or characteristics include, but are not limited to, vane leading edge location, vane trailing edge location, a radial distance of a vane from a diffuser centerline, vane chord length, a maximum thickness of a vane, a vane height, a vane flowwise shape distribution, a vane stagger angle, vane wedge angle, channel divergence angle, vane pitch, vane lean, vane twist, vane leading edge shape, e.g., leading edge chevron, swallowtail or scallop, etc., fixed or moveable vanes, a passage height between hub and shroud surfaces, a circumferential location of a biased passage, a number of biased passages, and one or more flowwise channels located in one or both of hub and shroud surfaces extending upstream and/or downstream of a diffuser passage. One or more diffuser design variables may be adjusted for a subset of vanes in a diffuser vane row to create one or more biased passages having a cross-sectional flow area distribution in a flowwise direction that is different than a cross-sectional flow area distribution of a plurality of other diffuser passages in the same vane row. Such diffuser design variable combinations may be applied to any type of diffuser, including, for example, any type of vaned diffuser, including flat plate, airfoil, straight channel, conical, single row or tandem, single or multiple vane type per row, and any solidity, and may also be applied to vaneless diffusers.

In yet other examples, diffusers made in accordance with the present disclosure include multi-vane groupings, wherein each vane grouping includes two or more vanes each having one or more different characteristics than other ones of the vanes in the grouping. The groupings may be arranged in a periodic arrangement around the circumference of the machine, or may be arranged in an aperiodic arrangement, thereby resulting in one or more biased passages. Diffusers made in accordance with the present disclosure may include any combination of vane groupings disclosed herein and biased passages disclosed herein. For example, a diffuser may include a periodic section of one or more vane groupings, and one or more aperiodic sections including one or more biased passages. The one or more characteristics that may vary among vanes in a vane grouping may include, but are not limited to, vane leading edge location, vane trailing edge location, a radial distance of a vane from a diffuser centerline, vane chord length, a maximum thickness of a vane, a vane height, a vane flowwise shape distribution, a vane stagger angle, vane wedge angle, channel divergence angle, vane pitch, vane lean, vane twist, vane leading edge shape, e.g., leading edge chevron, swallowtail or scallop, etc., fixed or moveable vanes, and a passage height between hub and shroud surfaces. One or more of such characteristics may be varied. Such groupings may be designed, configured, and located to improve the performance of a turbomachine, including increasing the controllability of spatial flow field variations, modifying flow field variations, and improving the performance of the turbomachinery in light of flow field variations, such as the circumferential pressure variations discussed above.

Examples of vaneless diffusers with biased passages include vaneless diffusers with flowwise recesses, e.g., channels, grooves, or other recesses located in the hub or shroud surface for varying a passage height in one or more circumferential locations. As described more below, elongate recesses include, but are not limited to, flowwise channels having substantially square edges and flowwise grooves having rounded edges. In some examples, vaneless diffusers may have an aperiodic arrangement of flowwise recesses. The flowwise length of such recesses may vary, from longer recesses extending upstream of the diffuser into the impeller and downstream of the diffuser, to shorter recesses located at any flowwise location in the diffuser and of any shorter length. Biased passages disclosed herein may have a cross-sectional area that is greater than a cross-sectional area of other passages in a diffuser row. Such increased flow area passage(s) may provide a biased relief passage that may be designed and configured to accept an asymmetric portion of an impeller exit flow and cause a more uniform distribution of flow into other non-biased passages. In other examples, biased passages disclosed herein may have a reduced cross-sectional area as compared to the cross-sectional area of other non-biased passages, including fully blocked passages. Thus, as used herein, a reduced area biased passage includes fully blocked passages, or the absence of a diffuser passage in a location where a passage would be for a fully periodic diffuser passage arrangement. Such decreased flow area biased passages may be designed and configured to redistribute or otherwise influence an asymmetric impeller exit flow field, thereby providing a more uniform distribution of flow in the non-biased passages.

The present disclosure also includes experimental and computational methods of designing flow structures for turbomachines to improve performance. In one example, a computational model of a turbomachine and/or diffuser may be developed. A circumferential pressure distribution may be calculated at one or more operating conditions and the performance of the diffuser may be analyzed. In some cases, a low-frequency circumferential variation in pressure will be calculated at the diffuser inlet. The computational model of the diffuser may be iteratively adjusted with the addition of one or more biased passages, and a circumferential pressure distribution and diffuser performance may be calculated for each case to identify an optimized biased passage design. In other examples, rather than calculating a circumferential pressure distribution, a seeded perturbation in the diffuser inlet pressure or other equivalent approach may be applied to the computational model for various diffuser designs to determine an optimized biased passage arrangement. In yet other examples, experimental methods of determining biased passage designs may be implemented, including instrumenting a testing platform with sufficient pressure measurements around the circumference of a diffuser inlet to fully characterize the primary components of any circumferential pressure variation. The circumferential pressure variation for various diffuser designs with and without biased passages may be measured and improved biased passage designs determined.

Figure 8:
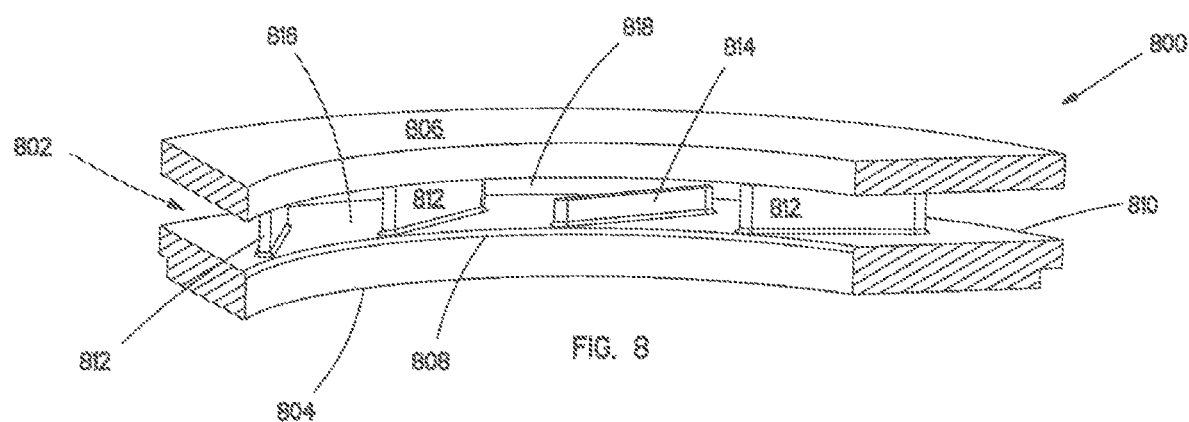
FIG. 8 shows a flat plate diffuser with a biased passage formed by a partial height vane affixed to a shroud surface.
Figure 9:
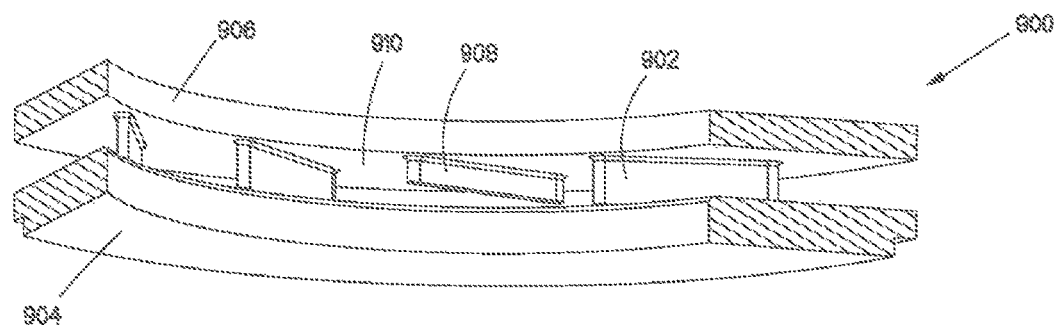
FIG. 9 shows a flat plate diffuser with a biased passage formed by a partial height vane affixed to a hub surface.

FIGS. 8-20 illustrate exemplary embodiments of vaned diffusers having one or more biased passages. FIG. 8 shows a portion of an exemplary vaned flat plate low solidity diffuser 800 that has a row of vanes 802 extending between a hub 804 and shroud 806 and extending in a flowwise direction between a diffuser inlet 808 and exit 810. Row 802 includes a plurality of first vanes 812 and at least one second vane 814. Although only three are shown, first vanes 812 are equally spaced around one or more portions of diffuser 800. As shown, second vane 814 has a different characteristic than first vanes 812, here a different height, with second vane 814 being a partial height vane affixed to hub 804. The partial height of second vane 814 results in a biased passage 816 that has a different cross-sectional area distribution in the flowwise direction than passage 816 between first vanes 812. Thus, diffuser 800 has a plurality of passages located around a circumference of the diffuser, including at least one periodic section of passages 816 extending between first vanes 812, wherein the section is periodic because the first vanes 812 are equally spaced at regular intervals around a diffuser centerline. Diffuser 800 also includes at least one aperiodic section including biased passage 818, the section being aperiodic because there is a discontinuity in the periodic nature of first vanes 812, here, biased passage 818 having a larger cross-sectional flow area than passages 816. Exemplary diffuser 800 is designed and configured for receiving a flow field having a circumferential pressure distribution and biased passage 816 is located, configured, and dimensioned to bias the circumferential pressure distribution toward circumferential uniformity, e.g., bias a low-frequency spatial pressure variation, such as the ones shown in FIGS. 1-5. Biased passage may also be located, configured, and dimensioned to improve the performance of a turbomachine, including increasing the controllability of spatial flow field variations, modifying flow field variations, and improving the performance of the turbomachinery in light of flow field variations. Diffuser 800 may have one or more of biased passages 816 located at any location around the circumference of the diffuser. FIG. 9 shows a diffuser 900 that is substantially the same as diffuser 800, including first vanes 902 extending between hub 904 and shroud 906, and at least one second vane 908, wherein second vane is partial height and results in biased passage. Unlike diffuser 800, second vane 908 is affixed to the shroud 906, rather than hub 904. Alternative embodiments may include combinations of second vanes 814 and 908, e.g., a single diffuser with one or more partial-height vanes affixed to the shroud surface and one or more partial-height vanes affixed to the hub surface.

FIG. 10 shows an exemplary diffuser 1000 that has a plurality of first vanes 1002 and at least one second vane 1004 having a different characteristic, here radial distance from a centerline 1005 of diffuser 1000 and stagger angle, thereby forming biased passage 1006. Broken line 1008 shows where one of first vanes 1002 would have been located if the periodic nature of first vanes had been continued, e.g., a periodic first vane location, as is the case with existing diffusers. Broken lines 1010 illustrate the stagger angle may be varied +/- from a first vane stagger angle. Although only a portion of diffuser 1000 is shown, the diffuser may include one or more biased passages 1006. First and second vanes 1002, 1004 may all be full height, or one or both may be partial height. As shown, exemplary second vane 1004 is slid back along a flowwise direction as compared to periodic first vane location 1008, resulting in leading edge 1012 and trailing edge 1014 both being a greater radial distance from centerline 1005 than leading and trailing edges 1016, 1018 of first vanes 1002. Biased passage 1006 creates an aperiodic section in diffuser 1000 in the form of a larger cross-sectional flow area at inlet 1020 of diffuser 1000.

Figure 11:
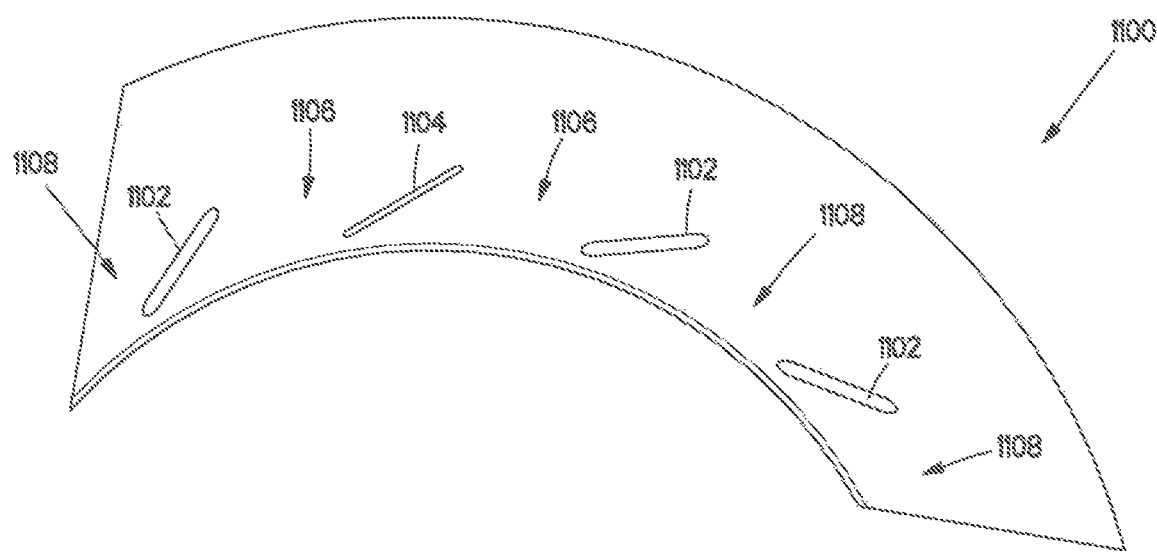
FIG. 11 shows a flat plate diffuser with a biased passage formed by a second vane having an alternate thickness.

FIG. 11 shows an exemplary diffuser 1100 that has a plurality of first vanes 1102 and at least one second vane 1104 having a different characteristic, here thickness, thereby forming biased passages 1106. Although only a portion of diffuser 1100 is shown, the diffuser may include two or more biased passages 1106. First and second vanes 1102, 1104 may all be full height, or one or both may be partial height. As shown, exemplary second vane 1104 is thinner than first vanes 1102, resulting in biased passages 1106 that have a different cross-sectional area distribution than passages 1108, creating an aperiodic section in diffuser 1100 in the form of a larger cross-sectional flow area adjacent second vane 1104.

Figure 12:
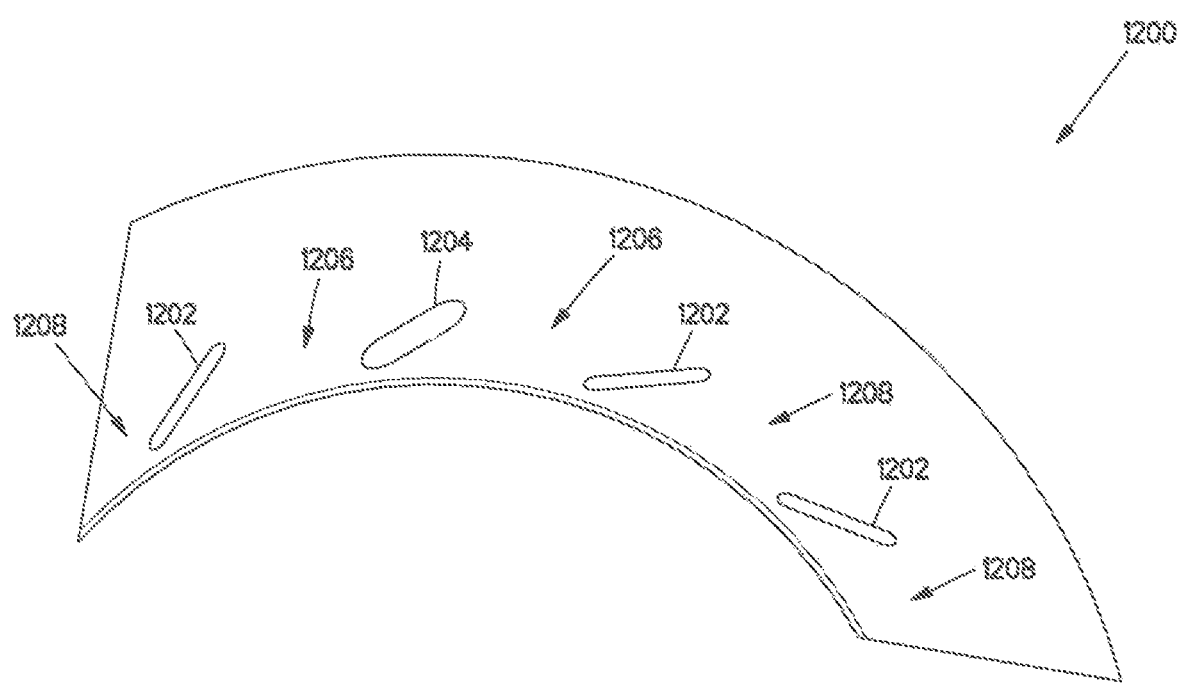
FIG. 12 shows a flat plate diffuser with a biased passage formed by a second vane having an alternate thickness.

FIG. 12 shows an exemplary diffuser 1200, which is similar to diffuser 1100 (FIG. 11) and has a plurality of first vanes 1202 and at least one second vane 1204 having a different characteristic, here maximum thickness, thereby forming biased passages 1206. Although only a portion of diffuser 1200 is shown, the diffuser may include two or more biased passages 1206. First and second vanes 1202, 1204 may all be full height, or one or both may be partial height. As shown, exemplary second vane 1204 is thicker than first vanes 1202, resulting in biased passages 1206 that have a different cross-sectional area distribution than passages 1208, creating an aperiodic section in diffuser 1200 in the form of a smaller cross-sectional flow area adjacent second vane 1204.

Figure 13:
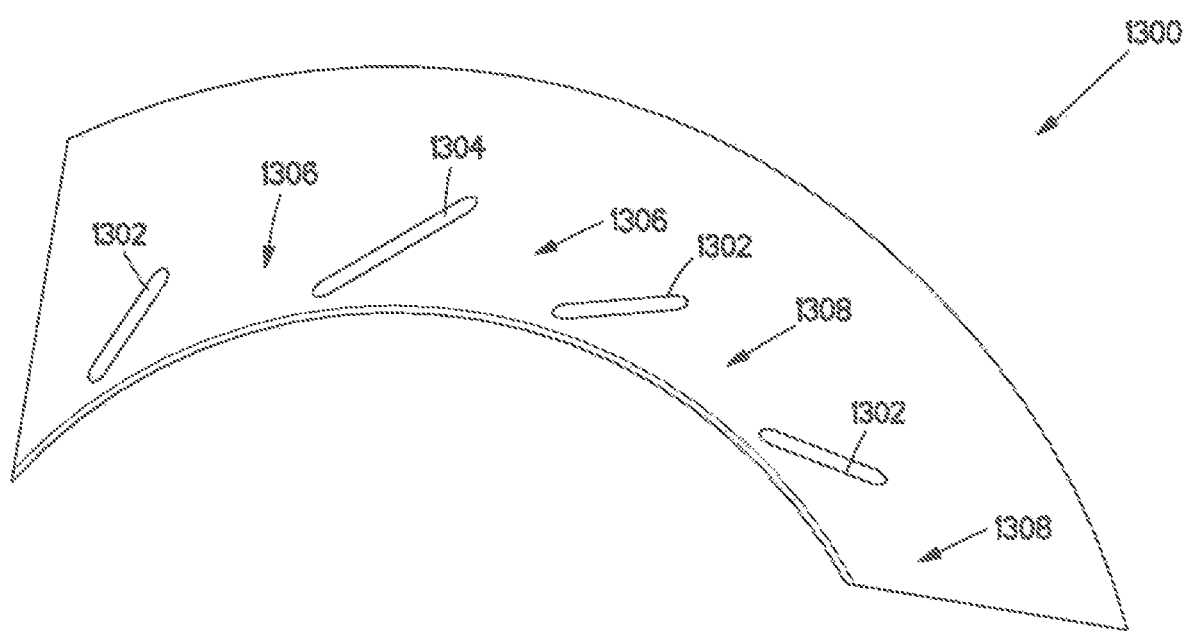
FIG. 13 shows a flat plate diffuser with a biased passage formed by a second vane having an alternate chord length.
Figure 14:
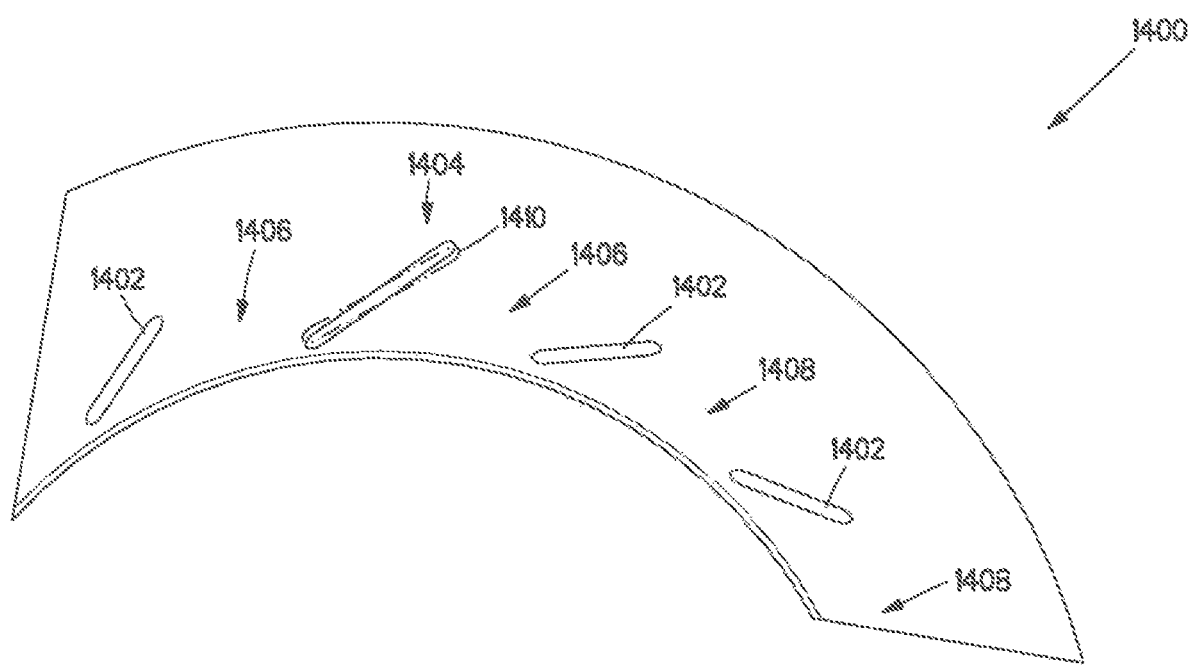
FIG. 14 shows a flat plate diffuser with a biased passage formed by a second vane having an alternate chord length and stagger angle.

FIG. 13 shows an exemplary diffuser 1300, which is similar to diffusers 1100 and 1200 (FIGS. 11 and 12) and has a plurality of first vanes 1302 and at least one second vane 1304 having a different characteristic, here chord length, thereby forming biased passages 1306. Although only a portion of diffuser 1300 is shown, the diffuser may include two or more biased passages 1306. First and second vanes 1302, 1304 may all be full height, or one or both may be partial height. As shown, exemplary second vane 1304 is longer than first vanes 1302, resulting in biased passages 1306 that have a different flowwise cross-sectional area distribution than passages 1308, creating an aperiodic section in diffuser 1300 proximate second vane 1304. FIG. 14 shows diffuser 1400, which is substantially the same as diffuser 1300 with equivalent components having the same name and same reference numeral suffix. Unlike diffuser 1300, second vane 1404 may have a different stagger angle than first vanes 1402, as indicated by broken line 1410, showing one possible alternative stagger angle. The particular stagger angle of second vane 1404 may be varied, including both positive and negative angles with respect to the first vane 1402 stagger angle.

Figure 15:
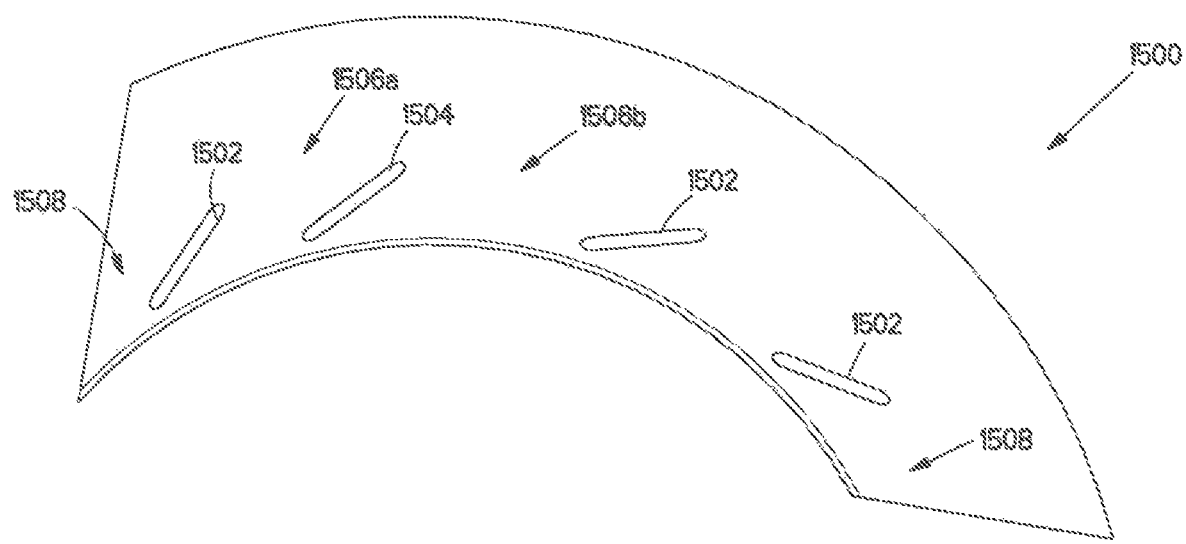
FIG. 15 shows a flat plate diffuser with a biased passage formed by a second vane having an alternate pitch.

FIG. 15 shows an exemplary diffuser 1500, which is similar to diffusers 1100-1400 (FIGS. 11-14) and has a plurality of first vanes 1502 and at least one second vane 1504 having a different characteristic, here pitch, resulting in a different circumferential spacing between second vane 1504 and adjacent vanes than the spacing between adjacent first vanes 1502, thereby forming biased passages 1506a and 1506b. Biased passage 1506a has a smaller cross-sectional area and 1506b has a larger cross-sectional area than passages 1508. Although only a portion of diffuser 1500 is shown, the diffuser may include two or more biased passages 1506a, b. First and second vanes 1502, 1504 may all be full height, or one or both may be partial height. As shown, exemplary second vane 1504 has the same pitch, shape, and chord length as first vanes 1202, but is located at a different circumferential location than a periodic first vane location, resulting in an aperiodic section and diffuser 1500 having a non-uniform and aperiodic circumferential vane pitch distribution.

Figure 16:
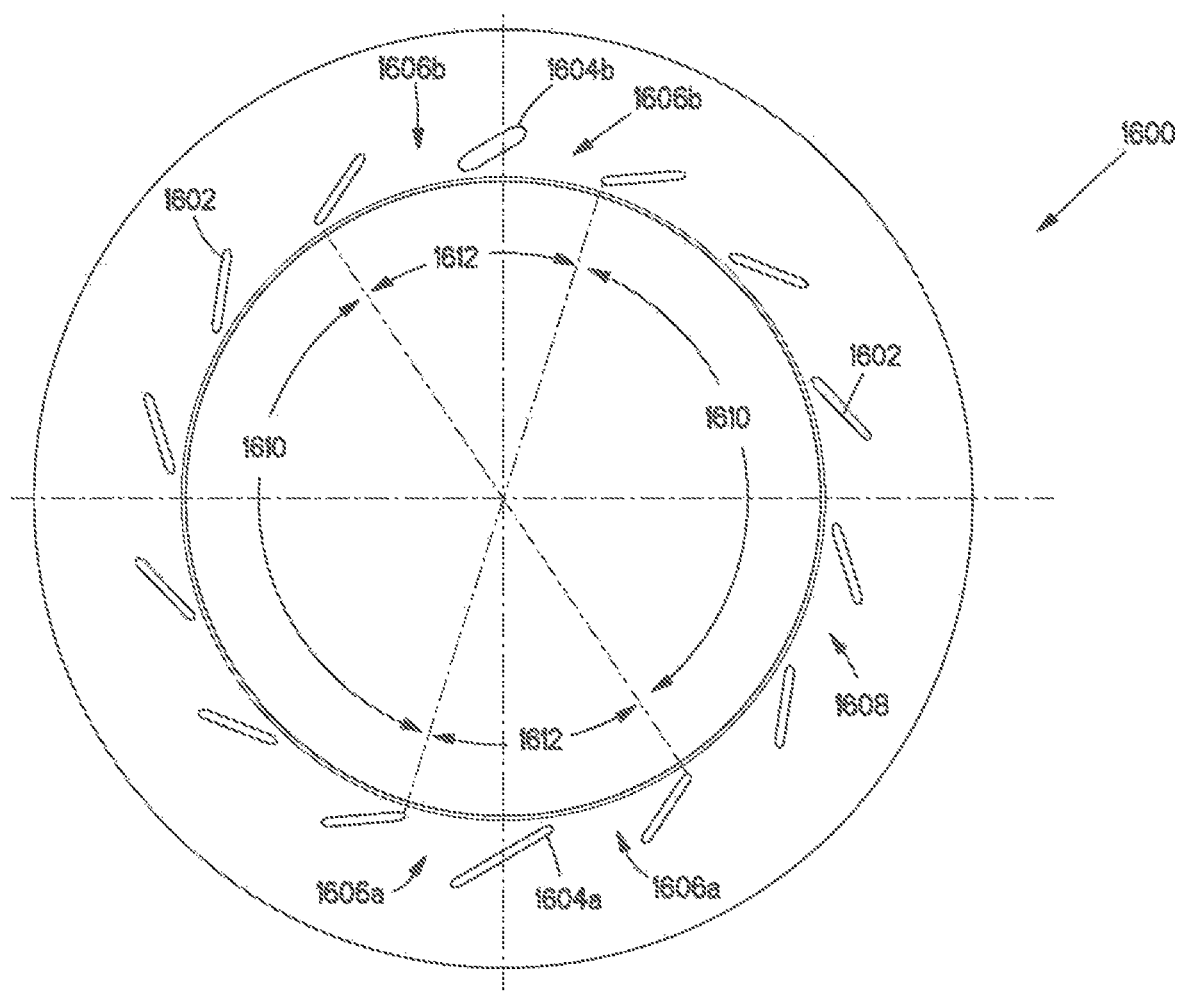
FIG. 16 shows a flat plate diffuser with a biased passage formed by second vanes having alternate chord length and thickness.

FIG. 16 shows exemplary diffuser 1600, which has a plurality of first vanes 1602 (only two of twelve labeled) and two second vanes 1604a, 1604b each having a different characteristic, here maximum thickness and chord length, than the first vanes, resulting in biased passages 1606a and 1606b. Second vane 1604a has the same thickness as the first vanes 1602, but a longer chord length, resulting in biased passages 1606a having a different flowwise cross-sectional area distribution than passages 1608. Second vane 1604b has a greater thickness than first vanes 1602, resulting in biased passages 1606b having a different flowwise cross-sectional area distribution, including a smaller cross-sectional area, than passages 1608. First and second vanes 1602, 1604a, 1604b may all be full height, or one or more may be partial height. As shown, second vanes 1604a, 1604b and associated biased passages 1606a, 1606b are spaced approximately 180 degrees around the circumference of diffuser 1600. First vanes 1602 are equally spaced from adjacent first vanes, providing two periodic sections 1610 and second vanes 1604a, 1604b result in two aperiodic sections 1612.

Figure 17:
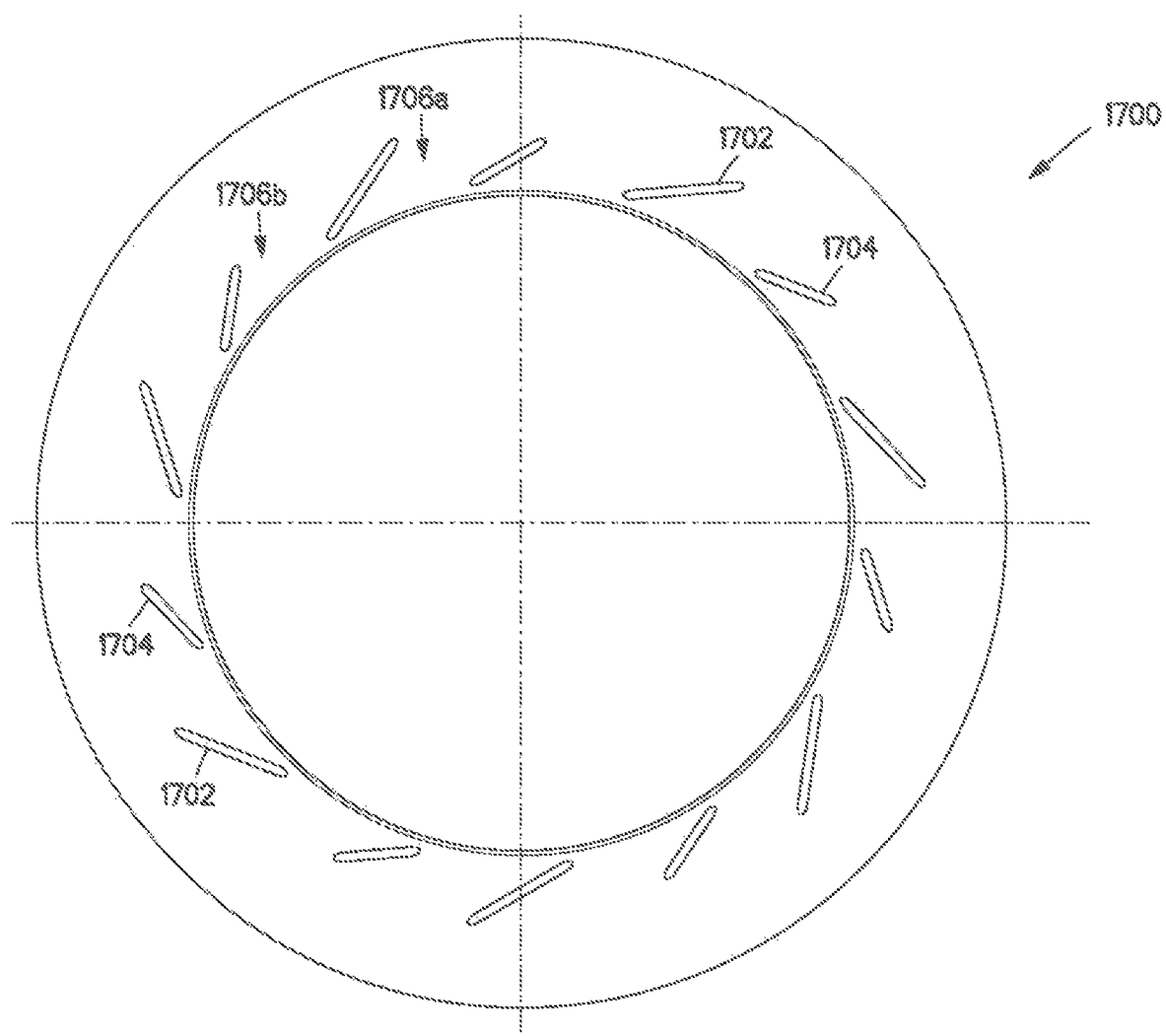
FIG. 17 shows a flat plate diffuser having a row of vanes that include first and second vanes, the second vanes having an alternate chord length.
Figure 18:
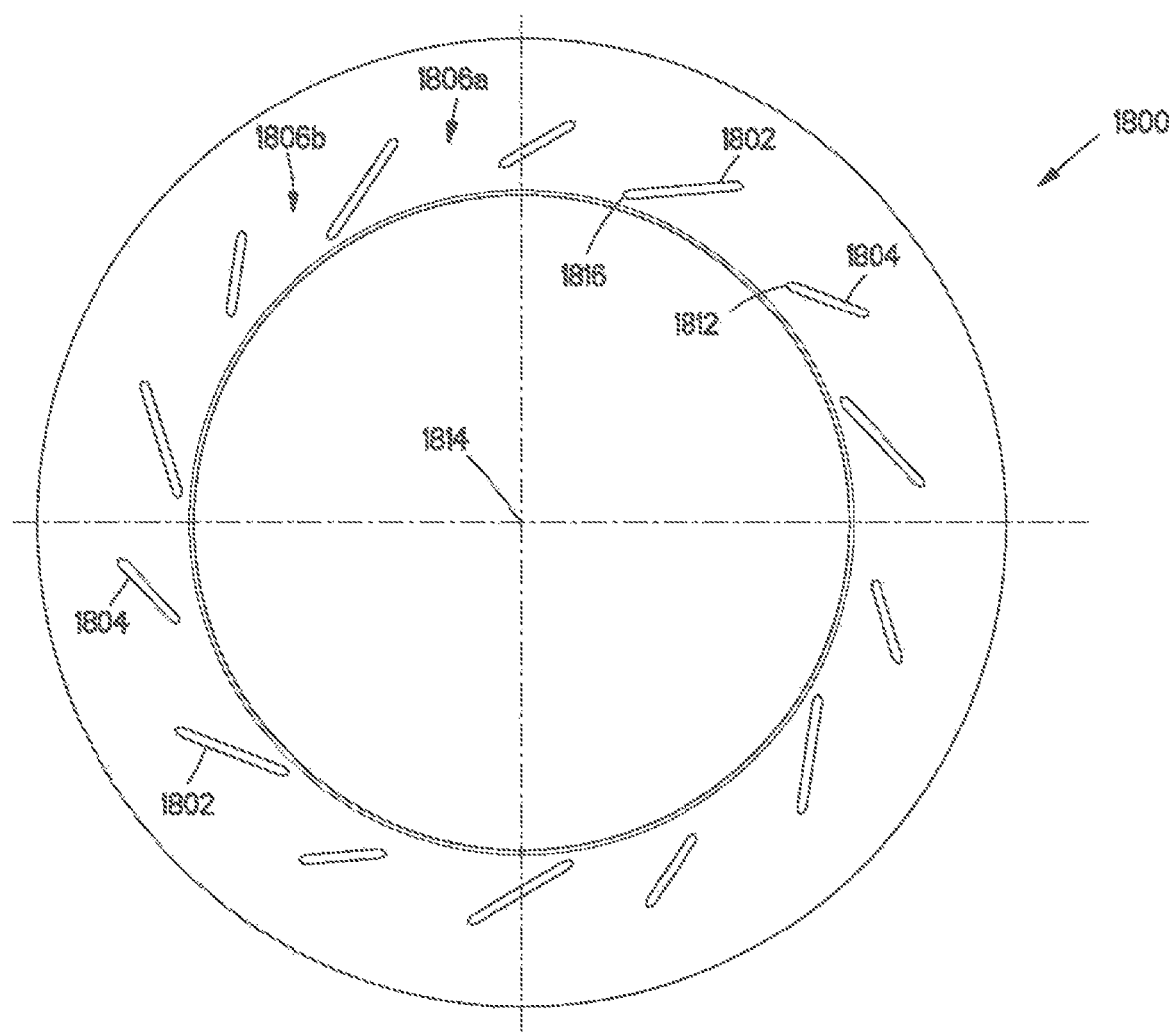
FIG. 18 shows a flat plate diffuser having a row of vanes that include first and second vanes, the second vanes having an alternate chord length and leading edge location.

FIG. 17 shows exemplary diffuser 1700, which has a plurality of first vanes 1702 (only two of seven labeled) and a plurality of second vanes 1704 (only two of seven labeled), each having a different characteristic from first vanes 1702, here chord length. Unlike diffuser 1600, diffuser 1700 has an equal number of first vanes 1702 and second vanes 1704 and a fully periodic arrangement of passages 1706a, 1706b. First vanes 1702 and second vanes 1704 may all be full height, or one or more may be partial height. First and second vanes 1702, 1704 are arranged in vane groupings, here two vanes per grouping, where diffuser 1700 has a periodic arrangement of multi-vane groupings, and wherein each vane grouping includes first and second vanes 1702, 1704, each having a different characteristic than other ones of the vanes in the grouping. FIG. 18 shows diffuser 1800, which is substantially the same as diffuser 1700, including a plurality of first vanes 1802 (only two of seven labeled) and a plurality of second vanes 1804 (only two of seven labeled), each having a different characteristic from first vanes 1802, here chord length. Unlike diffuser 1700, each of second vanes 1804 also have a different flowwise location than first vanes 1802, with a location of leading edge 1812 being at a different radial distance, here a greater distance, from diffuser centerline 1814, than a radial distance of first vane leading edges 1816 from the diffuser centerline. For example, each of second vanes 1804 are slid back in a flowwise direction as compared to a periodic first vane location. As with diffuser 1700, diffuser 1800 includes first and second vanes 1802, 1804 that are arranged in multi-vane groupings, here two vanes per grouping, where diffuser 1800 has a periodic arrangement of multi-vane groupings. In other examples, one or more characteristics of one or more of first and/or second vanes 1702, 1802, 1704, 1804 may be varied to create one or more aperiodic sections having biased passages that are configured to address asymmetric pressure fields, for example, the asymmetric pressure fields shown in FIGS. 1-5. The one or more characteristics may include, for example, any of the characteristics described herein, such as vane height, stagger angle, pitch, vane shape, vane leading and trailing edge location, and chord length, etc.

Figure 19:
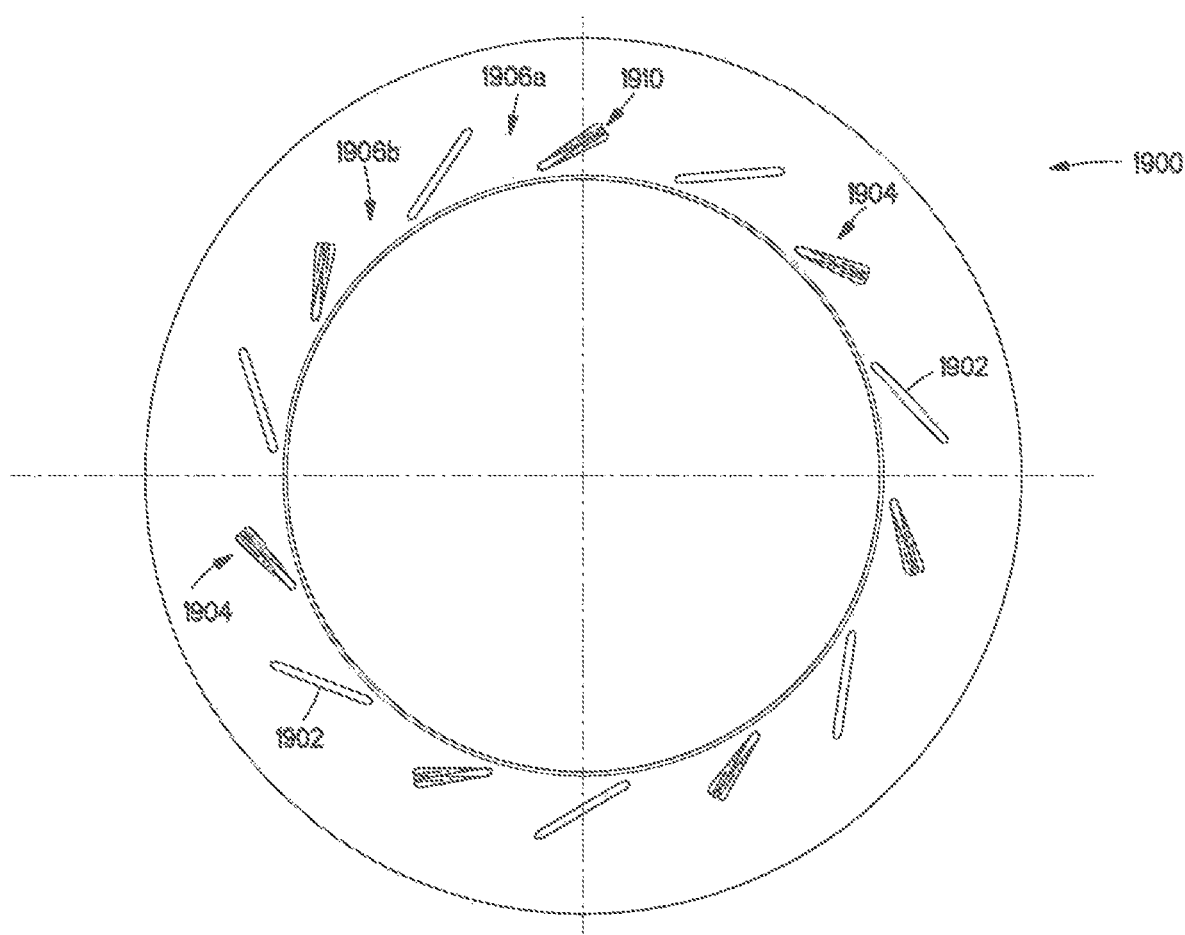
FIG. 19 shows a flat plate diffuser having a row of vanes that include first and second vanes, the second vanes having an alternate stagger angle.

FIG. 19 shows exemplary diffuser 1900, which has a plurality of first vanes 1902 (only two of seven labeled) and a plurality of second vanes 1904 (only two of seven labeled), each having a different characteristic from first vanes 1902, here chord length and stagger angle. Diffuser 1900 has an equal number of first vanes 1902 and second vanes 1904 and when second vanes 1904 are all at the same stagger angle, a fully periodic arrangement of passages 1906a, 1906b. First vanes 1902 and second vanes 1904 may all be full height, or one or more may be partial height. First and second vanes 1902, 1904 are arranged in vane groupings, here two vanes per grouping, where diffuser 1900 has a periodic arrangement of multi-vane groupings. As indicated by broken lines 1910, the stagger angle of second vanes 1904 may be the same as first vanes 1902, or may be varied in a positive or negative direction from the first vane stagger angle. In some embodiments, the stagger angle of the second vanes 1904 may be varied, and may be arranged to form an aperiodic arrangement with one or more biased passages. For example, all but one of the second vanes 1904 may have the same stagger angle as first vanes 1902, with one of the second vanes having an alternate stagger angle, thereby providing two biased passages on either side of the altered-angle full height second vane. In other examples, the stagger angle of other numbers of second vanes 1904 may be varied.

Figure 20:
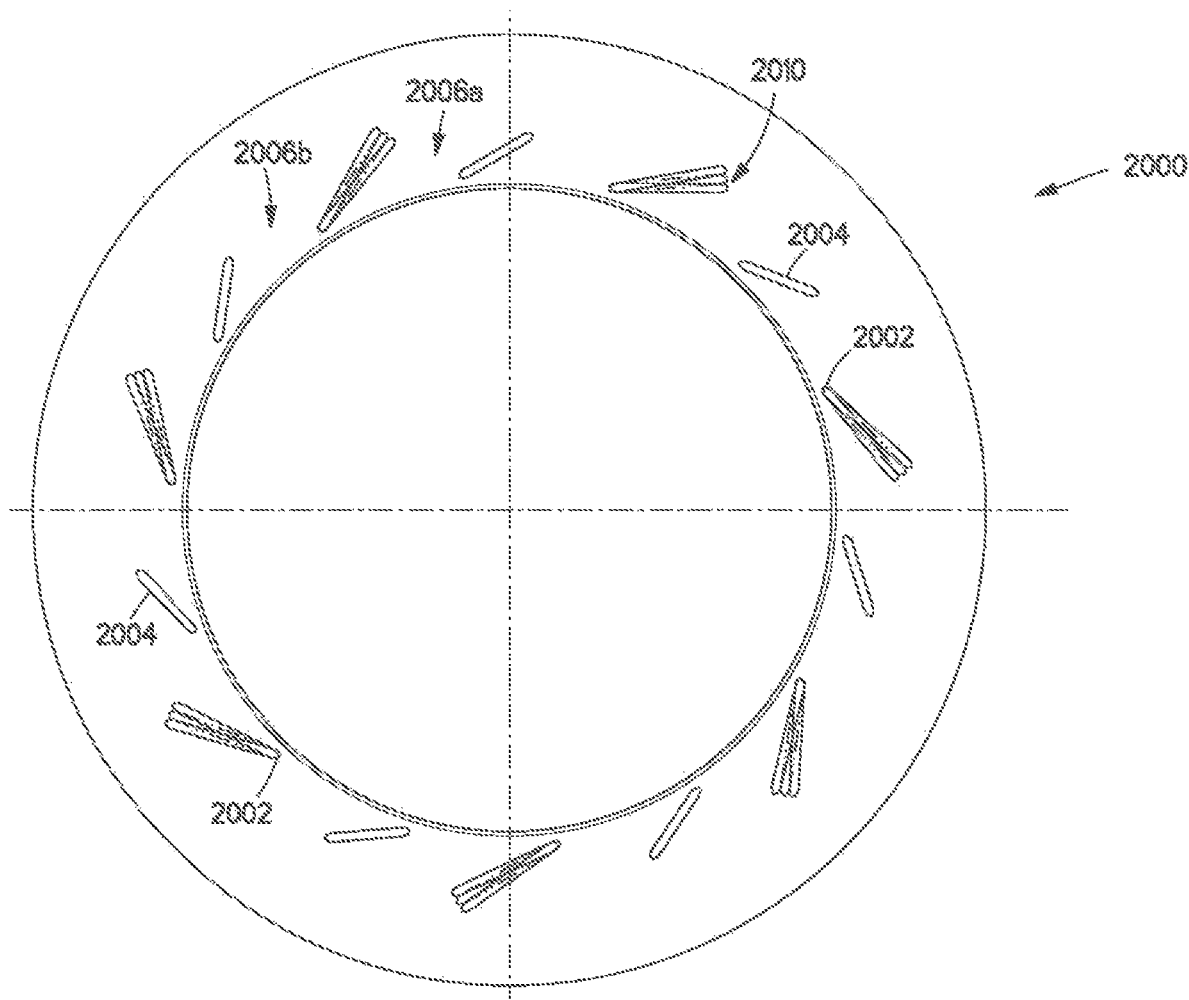
FIG. 20 shows a flat plate diffuser having a row of vanes that include first and second vanes, the first vanes having an alternate stagger angle.

FIG. 20 shows exemplary diffuser 2000, which is substantially the same as diffuser 1900 with equivalent components having the same name and same reference numeral suffix. Unlike diffuser 1900, where the stagger angle of second vanes 1904 may be varied, in diffuser 2000, the stagger angle of first vanes 2002 may be varied, as indicated by broken lines 2010. As with diffuser 1900, the stagger angle of less than all of first vanes 2002 may be different than other ones of the first vanes, thereby resulting in an aperiodic arrangement and one or more biased passages. First and second vanes 2002, 2004 are arranged in vane groupings, here two vanes per grouping, where diffuser 2000 has a periodic arrangement of multi-vane groupings. In other examples, characteristics of diffusers 1900 and 2000 may be combined, including varying the stagger angle of select ones of both the first and second vanes, or the stagger angle of a subset of first vanes 1902, 2002, or a subset of second vanes 1904, 2004.

In another embodiment, an exemplary diffuser may include a plurality of vane groupings, wherein each vane in the grouping has a different height. For example, a vane grouping may include two partial-height vanes, including a first partial height vane affixed to a hub or shroud surface and a second, adjacent partial height vane affixed to the hub or shroud surface. The diffuser may include a periodic arrangement of such groupings, e.g., in one example the first and second partial height vanes may all be equally spaced around the circumference of the machine. In one example, the first partial height vane may have a different height than the second partial height vane. For example, the first partial height vane may have a height between approximately 15% and approximately 65% of a passage height, and in some examples, approximately 50% of the passage height. The second partial height vane may have a height between approximately 5% and approximately 45% of the passage height, and in some examples, approximately 15%. In one example, the first and second partial height vanes in each vane grouping may be affixed to opposite sides of the passage, e.g., the first partial height vane may be affixed to the shroud and the second partial height vane may be affixed to the hub. Such partial-height vane groupings may reduce leading edge metal blockage and increase passage area, and allow for flow reorganization especially near choke, thereby improving performance. In yet other examples, vane groupings may include three or more vanes, such vane groupings repeated around the perimeter of the diffuser. In yet other examples, one or more biased passages may be formed by locating such vane groupings adjacent periodic sections. For example, in a diffuser with 14 vanes, a two vane grouping with first and second partial height vanes may be used in the place of 2 to 12 of the 14 vanes in one or more circumferential locations resulting in one or more biased passages.

Figure 21:
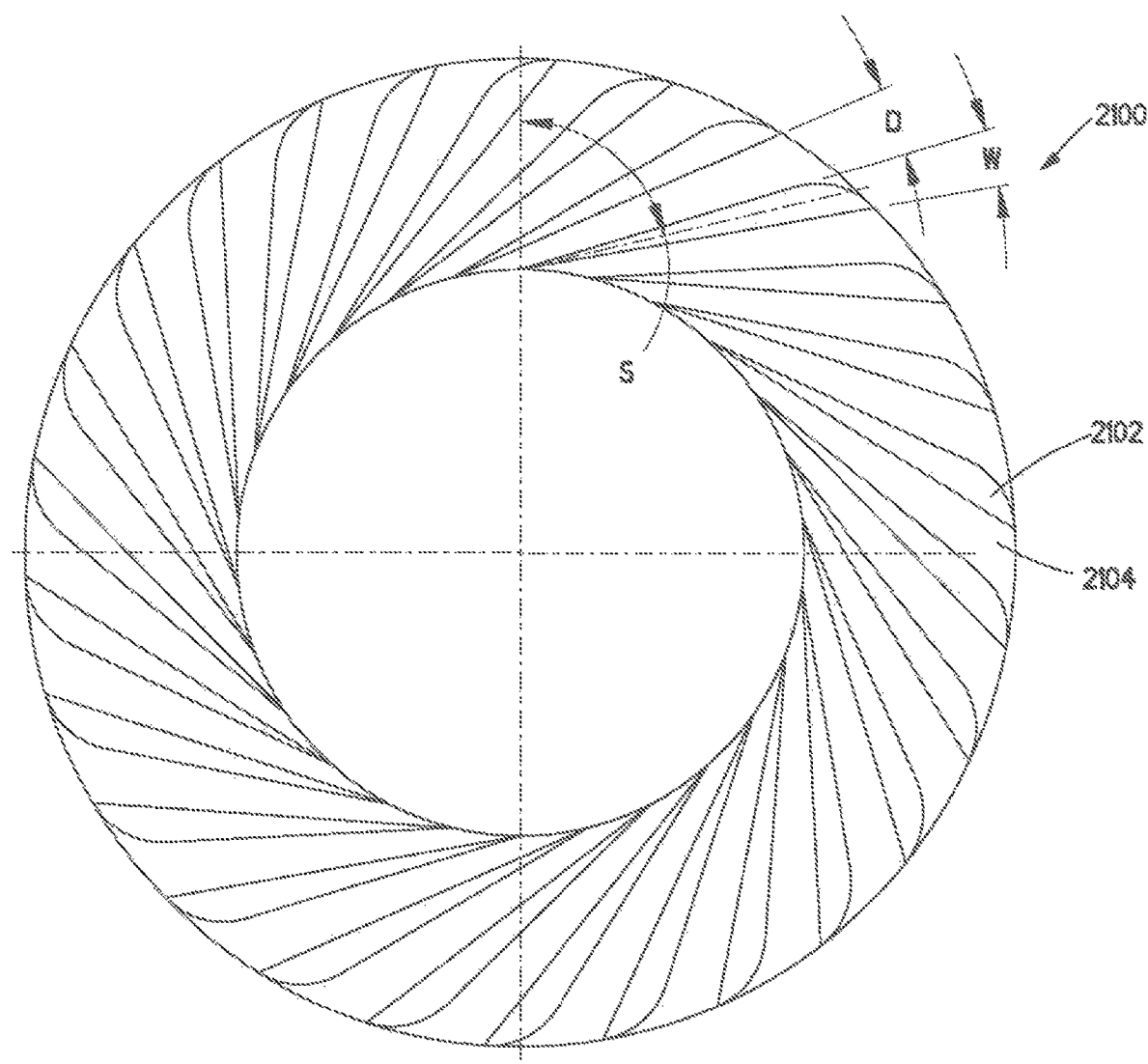
FIG. 21 shows a prior art channel diffuser.

FIG. 21 shows a prior art channel-type diffuser 2100 and FIGS. 22-33 show exemplary embodiments of channel-type diffusers made in accordance with the present disclosure. As shown in FIG. 21, prior art channel-type diffuser 2100 includes a plurality of vanes 2102 (only one labeled) defining passages 2104 (only one labeled) in the form of channels. Diffuser 2100 is similar to the diffuser used to generate the test data shown in FIGS. 4 and 5. Diffuser 2100 is fully periodic and symmetric, with each of vanes 2102 having the same stagger angle S and wedge angle W, and each passage 2104 having the same divergence angle D.

Figure 22:
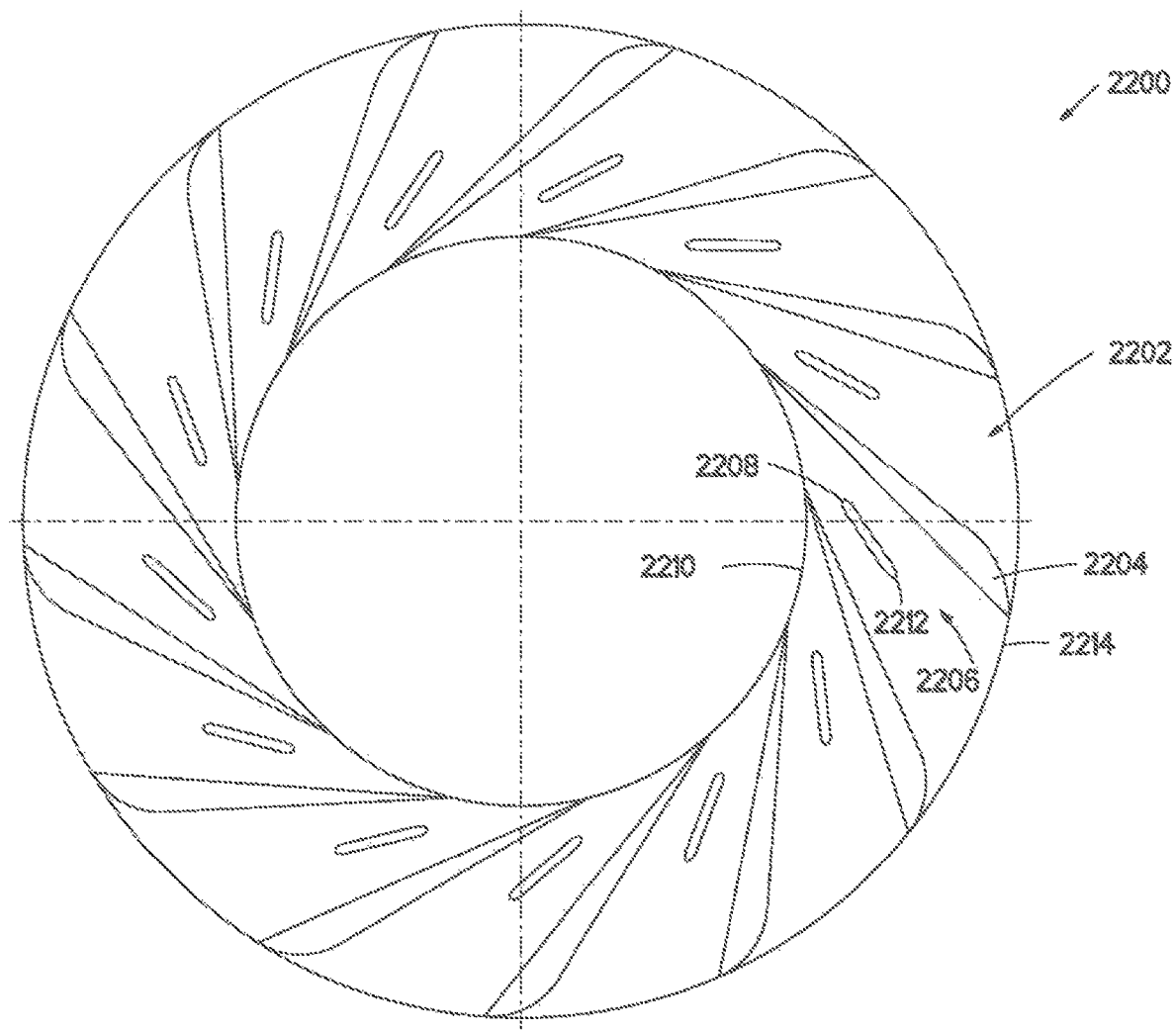
FIG. 22 shows a channel diffuser having first and second vanes, the second vanes being flat plate vanes.

FIG. 22 shows an exemplary channel diffuser 2200 having a plurality of passages 2202 (only one labeled) extending between a first vane 2204 (only one labeled). Unlike prior art diffuser 2100, however, each passage 2202 also includes a second vane 2206 located between adjacent first vanes 2204. Exemplary second vanes 2206 are flat plates, each have a leading edge 2208 that is downstream from diffuser inlet 2210, and a trailing edge 2212 that is positioned upstream of diffuser exit 2214. Second vanes 2206 are full height. In other examples, one or more of first and/or second vanes 2204, 2206 may be partial height. In the illustrated example, second vanes 2206 have a shorter chord length than a length of passages 2202, and are substantially centered in the passages in both circumferential and flowwise directions. First and second vanes 2204, 2206 are arranged in vane groupings, here two vanes per grouping, where diffuser 2200 has a periodic arrangement of multi-vane groupings. Exemplary passages 2202 are periodic, however, one or more characteristics of one or more of first vanes 2204 and/or second vanes 2206 may be varied to create one or more biased passages. One or more characteristics of one or more of first and/or second vanes 2204, 2206 may be varied to create one or more aperiodic sections having biased passages that are configured to address asymmetric pressure fields, for example, the asymmetric pressure fields shown in FIGS. 1-5. The one or more characteristics may include, for example, any of the characteristics described herein, such as vane height, stagger angle, pitch, vane shape, vane leading and trailing edge location, and chord length, etc. For example, second vanes 2206 may be of any type including airfoil type and need not all be centered in passages 2202; at least one may be relocated or resized to create a biased passage including partial height design.

Figure 23:
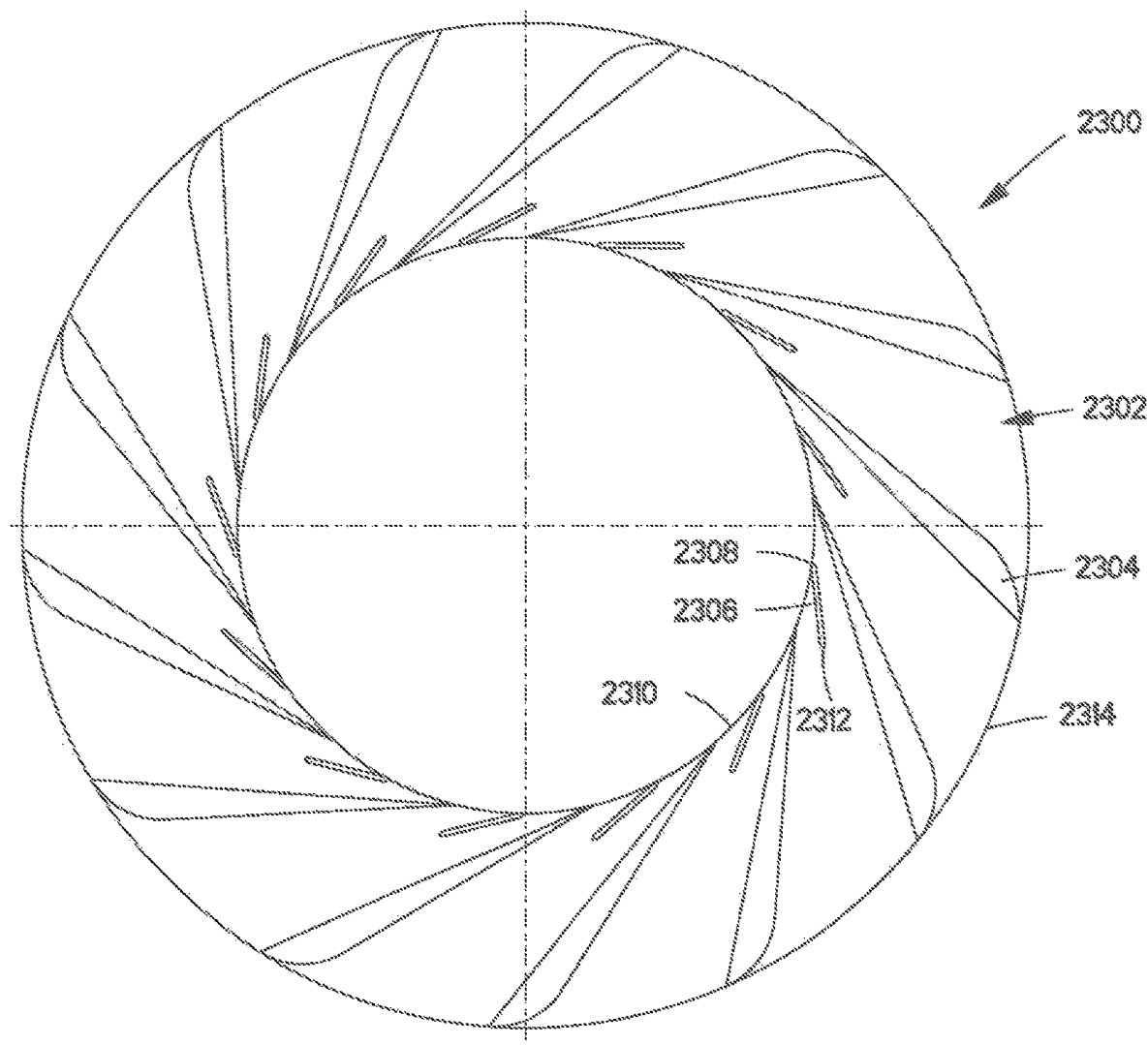
FIG. 23 shows a channel diffuser having first and second vanes, the second vanes being flat plate vanes.

FIG. 23 shows an exemplary channel diffuser 2300, which is similar to channel diffuser 2200 with equivalent components having the same name and same reference numeral suffix. Diffuser 2300 includes a plurality of passages 2302 (only one labeled) extending between first vanes 2304 (only one labeled). Each passage 2302 also includes a second vane 2306 located between adjacent first vanes 2304. Exemplary second vanes 2306 are flat plates. As compared to second vanes 2206 (FIG. 22), second vanes 2306 are narrower and positioned farther upstream, in this example with leading edge 2308 located at diffuser inlet 2310, and trailing edge 2312 located farther upstream of diffuser exit 2314. Second vanes 2306 are full height. In other examples, one or more of first and/or second vanes 2304, 2306 may be partial height. In the illustrated example, second vanes 2306 have a shorter chord length than a length of passages 2302, and are substantially centered in the passages in a circumferential direction and located upstream of a passage 2302 midpoint in the flowwise direction. First and second vanes 2304, 2306 are arranged in vane groupings, here two vanes per grouping, where diffuser 2300 has a periodic arrangement of multi-vane groupings. Exemplary passages 2302 are periodic, however, one or more characteristics of one or more of first vane 2304 and/or second vanes 2306 may be varied to create one or more biased passages. One or more characteristics of one or more of first and/or second vanes 2304, 2306 may be varied to create one or more aperiodic sections having biased passages that are configured to address asymmetric pressure fields, for example, the asymmetric pressure fields shown in FIGS. 1-5. The one or more characteristics may include, for example, any of the characteristics described herein, such as vane height, stagger angle, pitch, vane shape, vane leading and trailing edge location, and chord length, etc. For example, second vanes 2306 may be of any type including airfoil type and need not all be centered in passages 2302; at least one may be relocated or resized to create a biased passage including partial height design.

Figure 24:
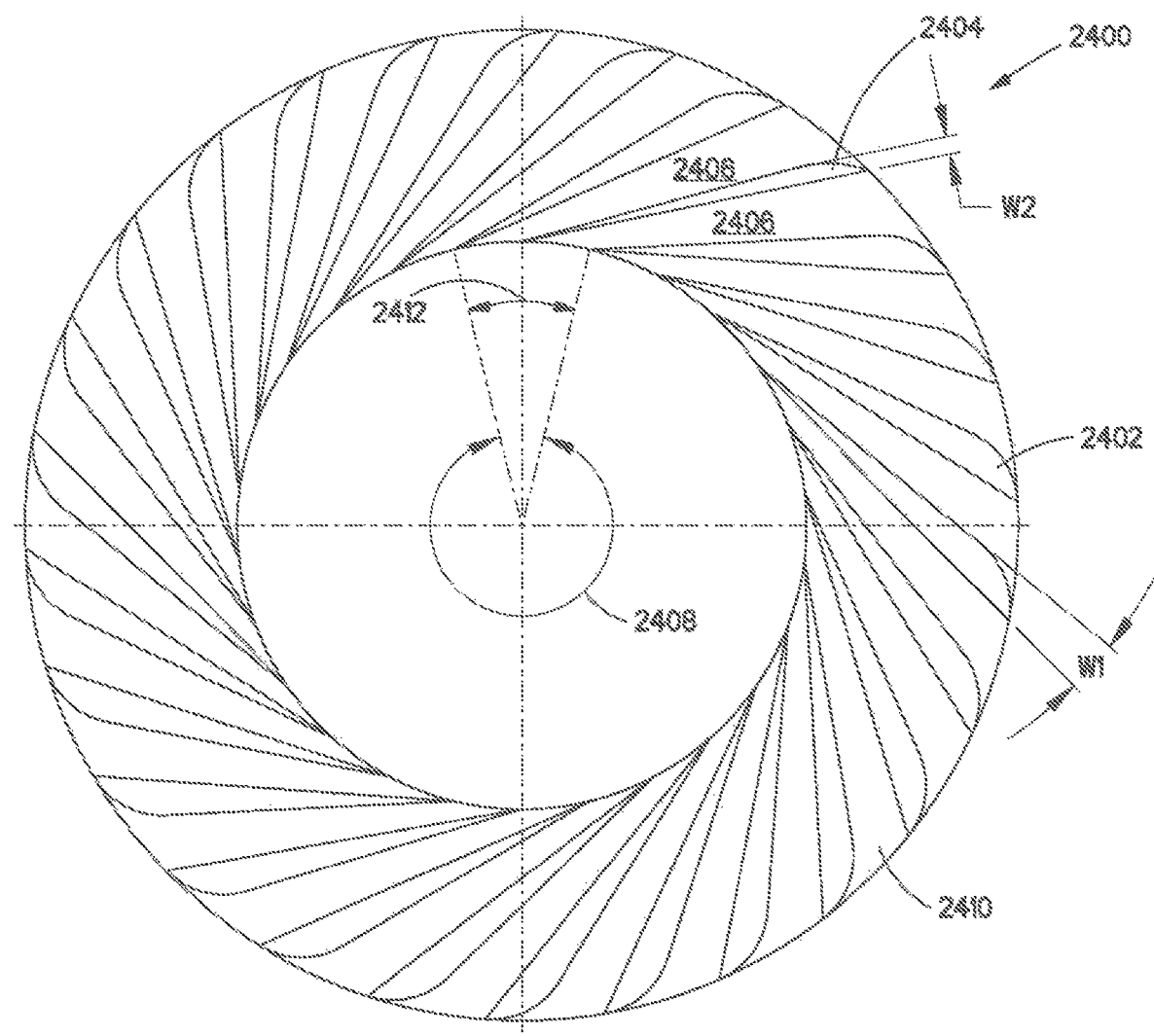
FIG. 24 shows a channel diffuser with a biased passage formed by a second vane having alternate wedge angle.

FIG. 24 shows an exemplary channel diffuser 2400 that is the same as prior art diffuser 2100 (FIG. 21) except that diffuser 2400 includes a plurality of first vanes 2402 and one second vane 2404 that has a characteristic that is different than first vanes 2402, here, wedge angle. In the illustrated example, diffuser 2400 includes a single second vane 2404 located in a first vane 2402 periodic location, or where a first vane 2402 would have been located in a prior art arrangement. Second vane 2404 has a lower wedge angle W2 than first vane 2402 wedge angle W1. The smaller wedge angle W2 of second vane 2404 results in two biased passages 2406. Diffuser 2400 includes a periodic section 2408 of first vanes 2402 and associated passages 2410 and an aperiodic section 2412 including the two biased passages 2406. In other examples, one or more additional first vanes 2402 may be replaced with second vanes 2404 that may have one or more characteristics that are different than first vanes 2402, thereby creating one or more additional biased passages.

Figure 25:
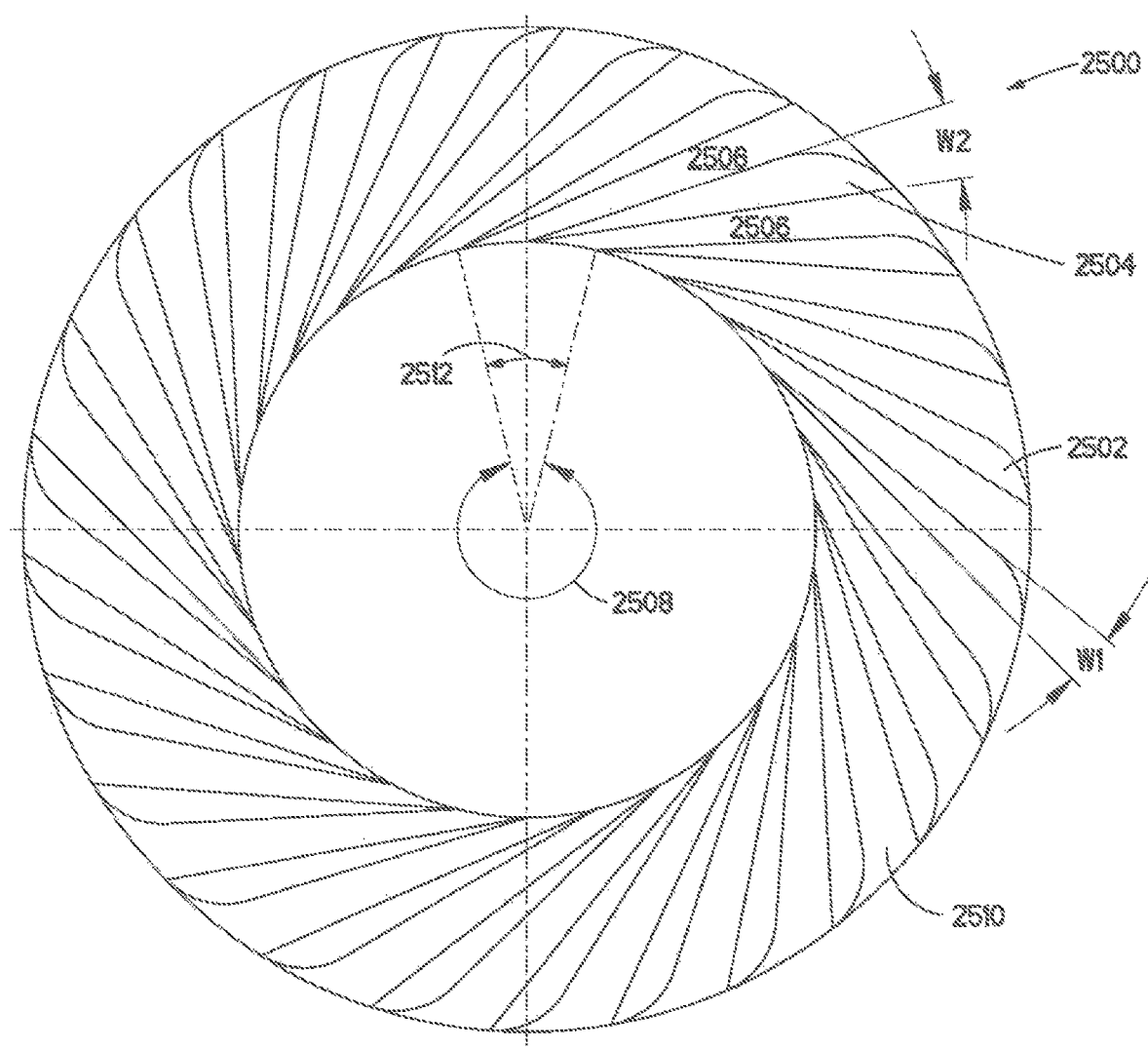
FIG. 25 shows a channel diffuser with a biased passage formed by a second vane having alternate wedge angle.

FIG. 25 shows an exemplary channel diffuser 2500 that is similar to diffuser 2400 (FIG. 24) with equivalent components having the same name and same reference numeral suffix. Diffuser 2500 includes a plurality of first vanes 2502 and one second vane 2504 that has a characteristic that is different than first vanes 2502, here, wedge angle. Unlike diffuser 2400, second vane 2504 has a larger wedge angle than first vanes 2502. In the illustrated example, diffuser 2500 includes a single second vane 2504 located in a first vane 2502 periodic location, or where a first vane 2502 would have been located in a prior art arrangement. Second vane 2504 has a larger wedge angle W2 than first vane 2502 wedge angle W1. The larger wedge angle W2 of second vane 2404 results in two biased passages 2506 that have a smaller cross-sectional area than passages 2510. Diffuser 2500 includes a periodic section 2508 of first vanes 2502 and associated passages 2510 and an aperiodic section 2512 including the two biased passages 2506. In other examples, one or more additional first vanes 2502 may be replaced with second vanes 2504 that may have one or more characteristics that are different than first vane 2502, thereby creating one or more additional biased passages.

Figure 26:
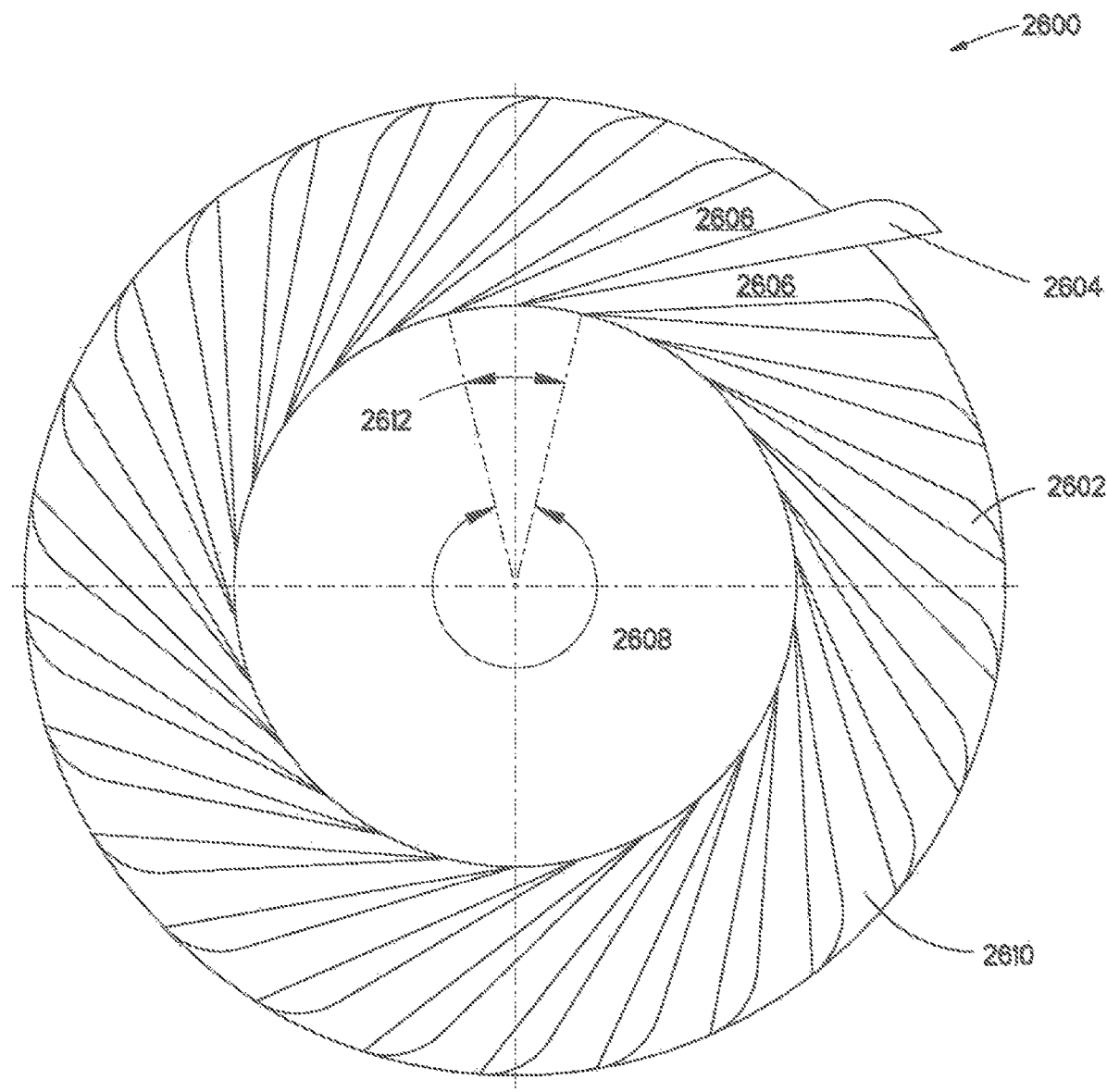
FIG. 26 shows a channel diffuser with a biased passage formed by a second vane having alternate chord length.

FIG. 26 shows an exemplary channel diffuser 2600 that is similar to diffusers 2400 (FIG. 24) and 2500 (FIG. 25) with equivalent components having the same name and same reference numeral suffix. Diffuser 2600 includes a plurality of first vanes 2602 and one second vane 2604 that has a characteristic that is different than first vane 2602, here, chord length. In the illustrated example, diffuser 2600 includes a single second vane 2604 located in a first vane 2602 periodic location, or where a first vane 2602 would have been located in a prior art arrangement. The longer length of second vane 2604 results in two biased passages 2606 that have a different flowwise cross-sectional area distribution than passages 2610, and result in the trailing edge of second vane 2604 acting as an additional flow guide at diffuser exit to reduce losses at the diffuser exit. Diffuser 2600 includes a periodic section 2608 of first vanes 2602 and associated passages 2610 and an aperiodic section 2612 including the two biased passages 2606. In other examples, one or more additional first vanes 2602 may be replaced with second vanes 2604 that may have one or more characteristics that are different than first vanes 2602, thereby creating one or more additional biased passages.

Figure 27:
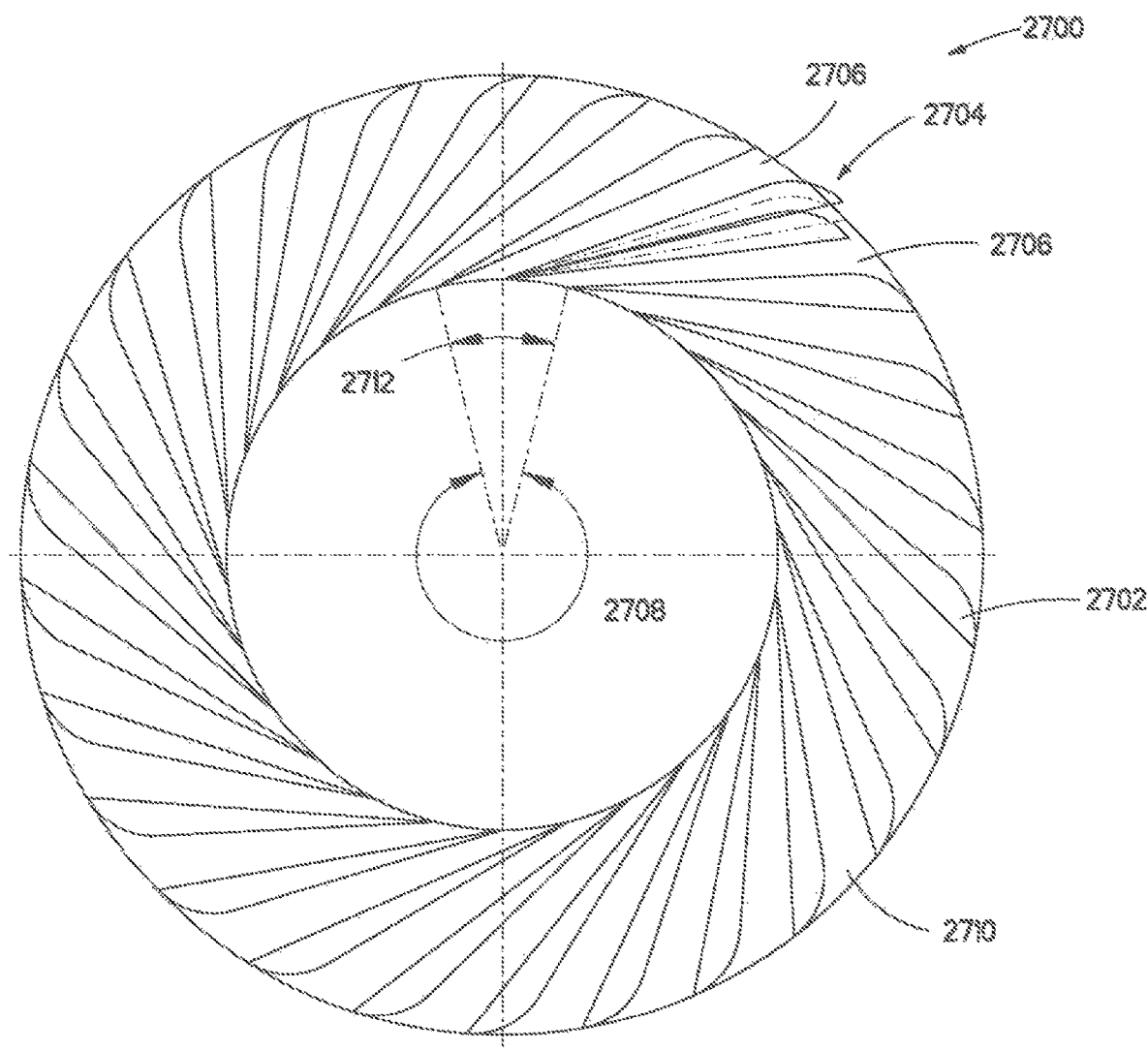
FIG. 27 shows a channel diffuser with a biased passage formed by a second vane having alternate stagger angle.

FIG. 27 shows an exemplary channel diffuser 2700 that is similar to diffusers 2400 (FIG. 24), 2500 (FIG. 25), and 2600 (FIG. 26) with equivalent components having the same name and same reference numeral suffix. Diffuser 2700 includes a plurality of first vanes 2702 and one second vane 2704 that has a characteristic that is different than first vane 2702, here, vane stagger angle, resulting in alternate passage divergence angles. In the illustrated example, diffuser 2700 includes a single second vane 2704 located approximately where a first vane 2702 would have been located in a prior art arrangement. As indicated by the broken lines, the stagger angle of second vane 2704 may be varied in a +/− direction relative to the stagger angle of first vanes 2702, resulting in two biased passages 2706 that have a different flowwise cross-sectional area distribution than passages 2710. Diffuser 2700 includes a periodic section 2708 of first vanes 2702 and associated passages 2710 and an aperiodic section 2712 including the two biased passages 2706. In other examples, one or more additional first vanes 2702 may be replaced with second vanes 2704 that may have one or more characteristics that are different than first vanes 2702, thereby creating one or more additional biased passages.

Figure 28:
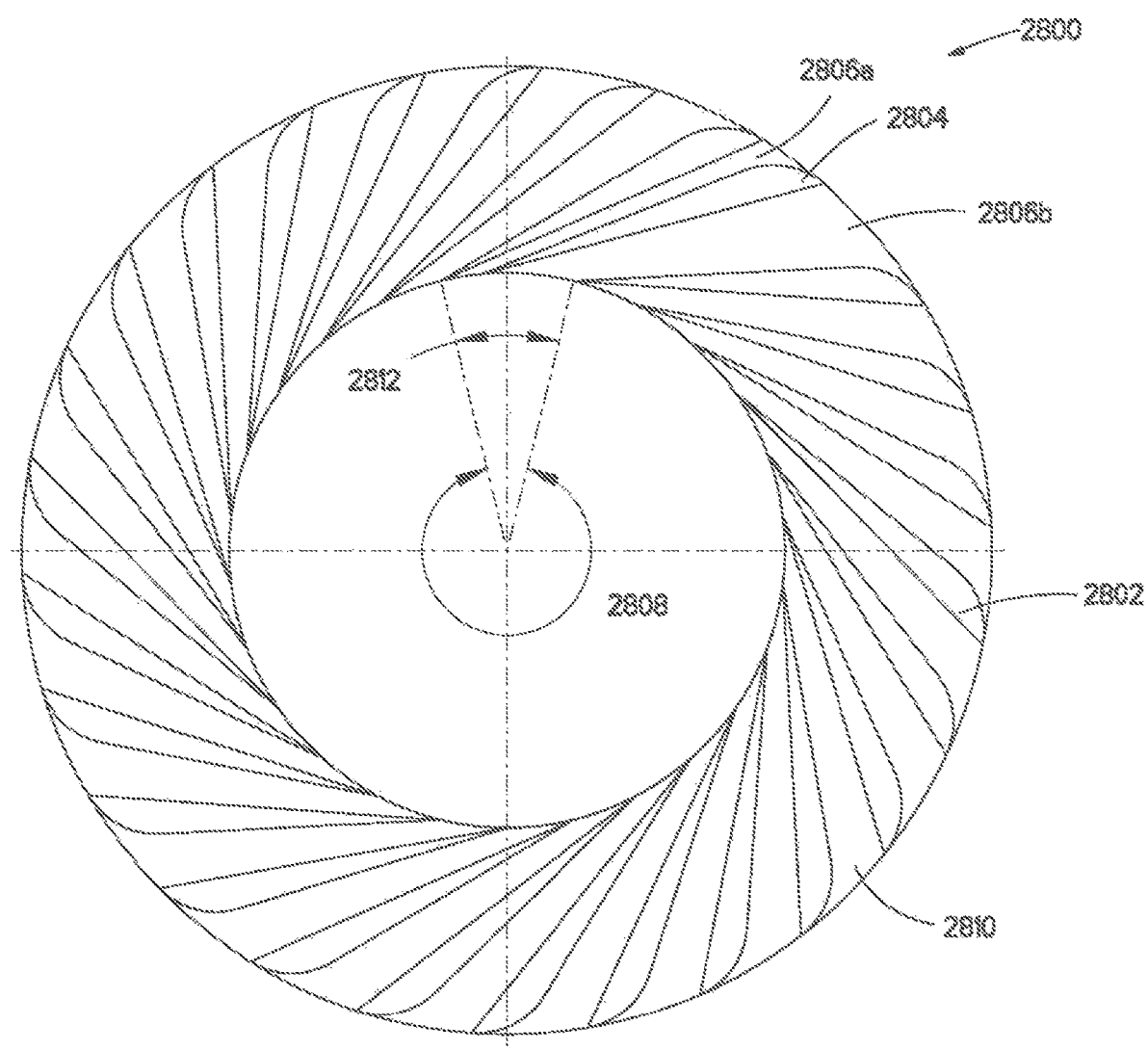
FIG. 28 shows a channel diffuser with a biased passage formed by a second vane having alternate pitch.

FIG. 28 shows an exemplary channel diffuser 2800 that is similar to diffusers 2400 (FIG. 24), 2500 (FIG. 25), 2600 (FIG. 26), and 2700 (FIG. 27) with equivalent components having the same name and same reference numeral suffix. Diffuser 2800 includes a plurality of first vanes 2802 and one second vane 2804 that has a characteristic that is different than first vane 2802, here, vane pitch, thereby altering vane circumferential location and spacing. In the illustrated example, diffuser 2800 includes a single second vane 2804 in the place of one of first vane 2802. As shown, the pitch of second vane 2804 is different than the pitch of first vanes 2802, resulting in two biased passages 2806a, 2806b that have different flowwise cross-sectional area distributions than passages 2810. Diffuser 2800 includes a periodic section 2808 of first vanes 2802 and associated passages 2810 and an aperiodic section 2812 including the two biased passages 2806a, 2806b. In other examples, one or more additional first vanes 2802 may be replaced with second vanes 2804 that may have one or more characteristics that are different than first vane 2802, thereby creating one or more additional biased passages.

Figure 29:
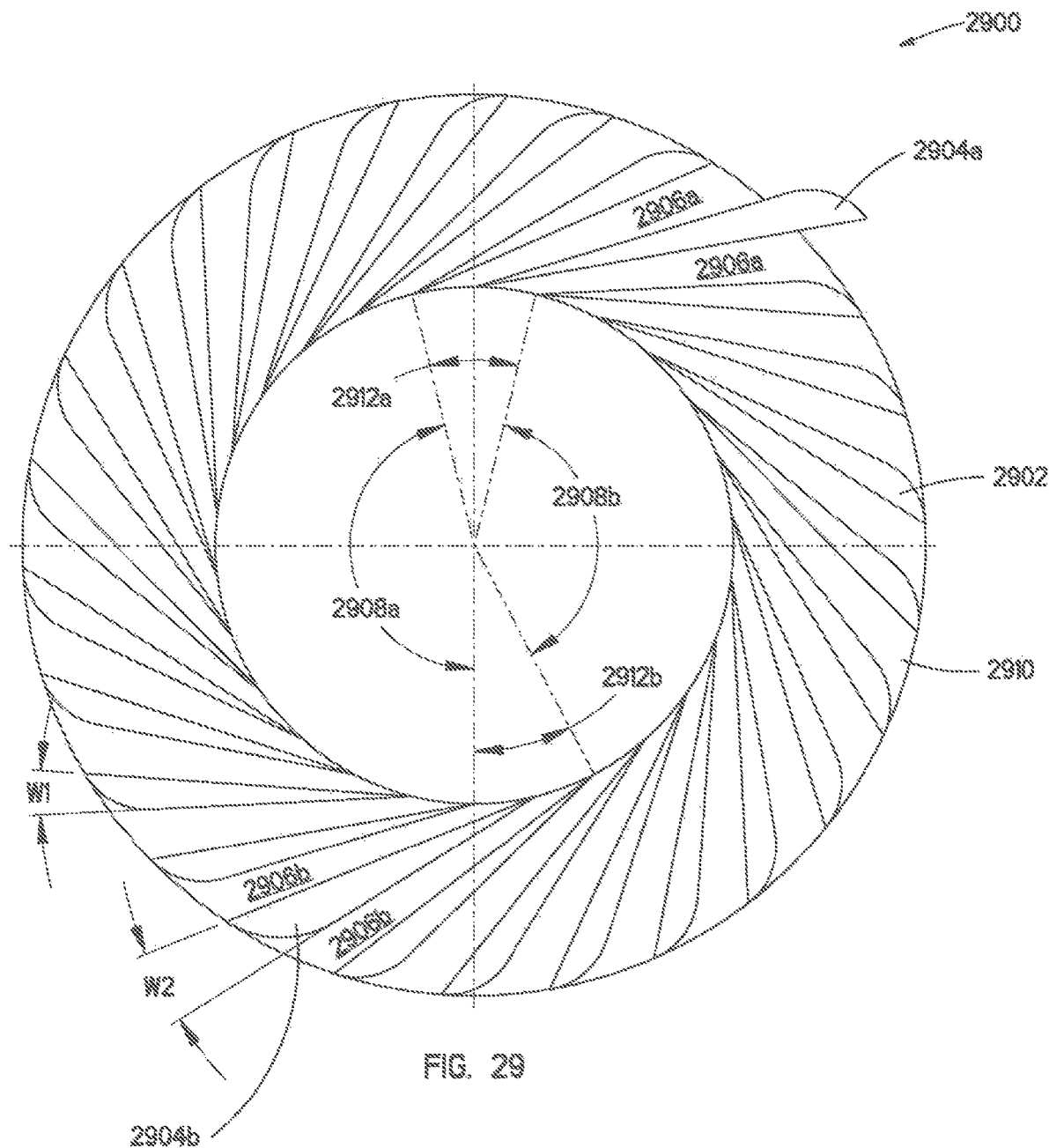
FIG. 29 shows a channel diffuser with a biased passage formed by second vanes having alternate chord length and wedge angle.

FIG. 29 shows an exemplary diffuser 2900, which combines the characteristics of diffusers 2500 (FIG. 25) and 2600 (FIG. 26). As shown, diffuser 2900 includes a plurality of first vanes 2902 and two second vanes 2904a, 2904b that each have a characteristic that is different than first vanes 2902. Second vane 2904a has a greater chord length than first vanes 2902 and second vane 2904b has a greater wedge angle W2 than wedge angle W1 of first vanes 2902, resulting in biased passages 2906a and 2906b that have different flowwise cross-sectional area distributions than passages 2910. Diffuser 2900 includes periodic sections 2908a, 2908b of first vanes 2902 and associated passages 2910 and aperiodic sections 2912a, 2912b including biased passages 2906a, 2906b, respectively. In other examples, one or more additional first vanes 2902 may be replaced with second vanes 2904 that may have one or more characteristics that are different than first vanes 2902, thereby creating one or more additional biased passages.

Figure 30:
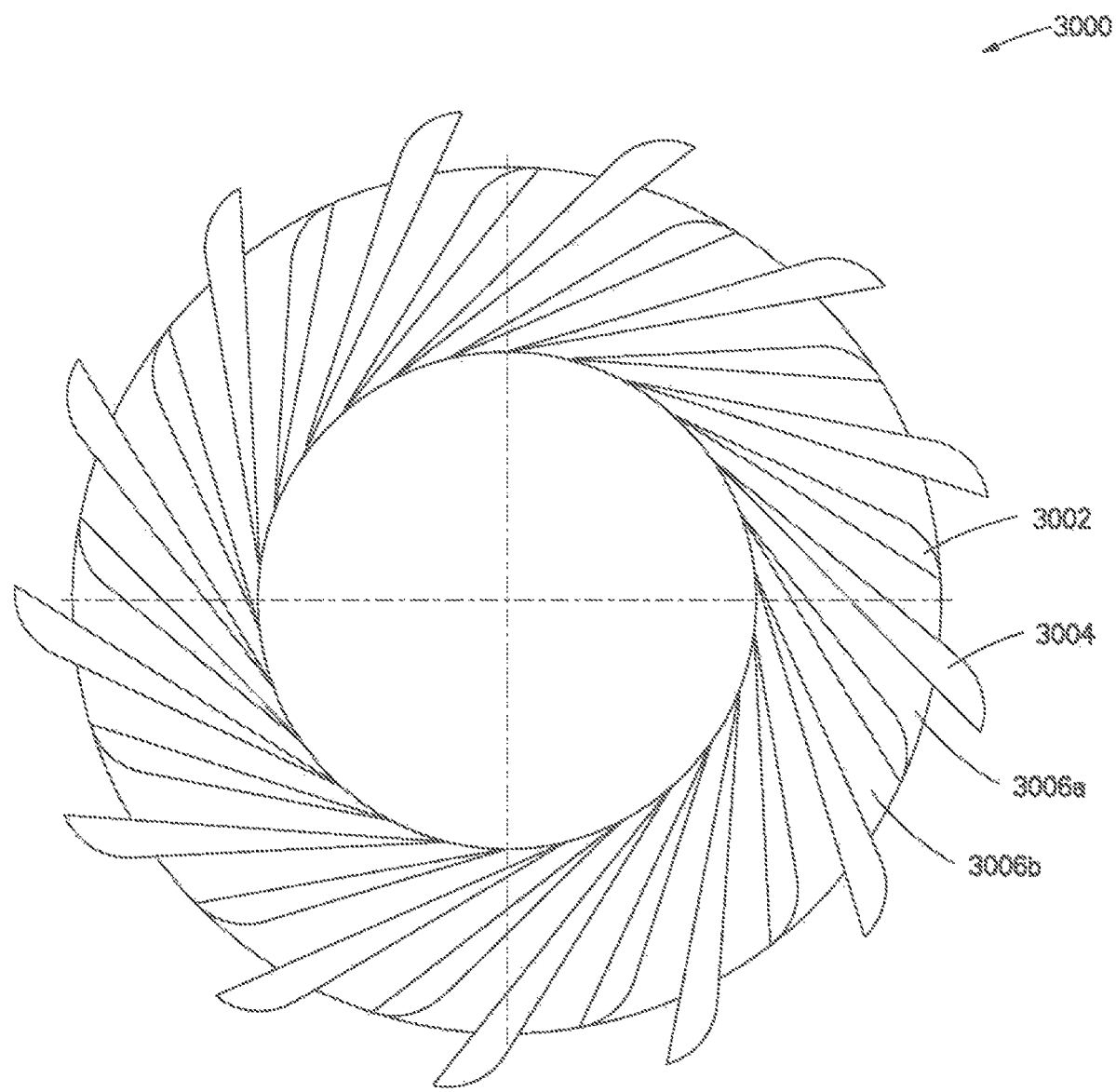
FIG. 30 shows a channel diffuser having a row of vanes that include first and second vanes, the second vanes having an alternate chord length.
Figure 31:
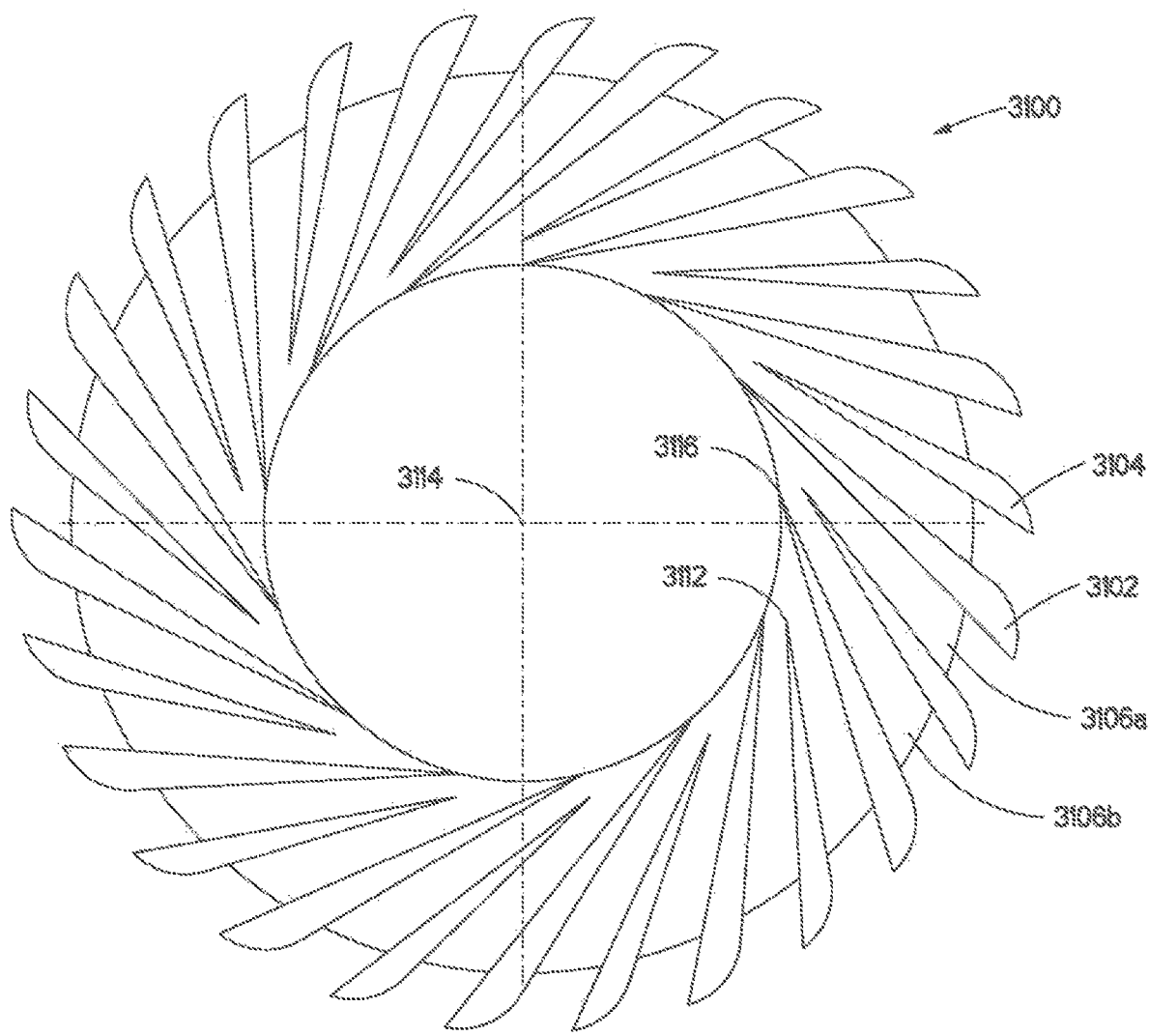
FIG. 31 shows a channel diffuser having a row of vanes that include first and second vanes, the second vanes having an alternate chord length and leading edge location.

FIG. 30 shows an exemplary channel diffuser 3000 which has a plurality of first vanes 3002 (only one labeled) and a plurality of second vanes 3004 (only one labeled), each of the second vanes having a different characteristic from first vanes 3002, here chord length. Diffuser 3000 has an equal number of first vanes 3002 and second vanes 3004 and a fully periodic arrangement of passages 3006a, 3006b. As with any of the channel diffusers disclosed herein, first vanes 3002 and second vanes 3004 may all be full height, or one or more may be partial height. FIG. 31 shows diffuser 3100, which is similar to diffuser 3000, including a plurality of first vanes 3102 (only one labeled) and a plurality of second vanes 3104 (only one labeled), each of the second vanes having a different characteristic from first vanes 3102, here chord length and flowwise location. Each of second vanes 3104 have a different flowwise location than first vanes 3102, with a location of leading edge 3112 being at a different radial distance, here a greater distance, from diffuser centerline 3114, than a radial distance of first vane leading edges 3116 from the diffuser centerline. For example, each of second vanes 3104 are slid back in a flowwise direction as compared to a periodic first vane location. One or more characteristics of one or more of first and/or second vanes 3002, 3102, 3004, 3104 may be varied to create one or more aperiodic sections having biased passages that are configured to address asymmetric pressure fields, for example, the asymmetric pressure fields shown in FIGS. 1-5. The one or more characteristics may include, for example, any of the characteristics described herein, such as vane height, stagger angle, pitch, vane shape, vane leading and trailing edge location, and chord length, etc.

Figure 32:
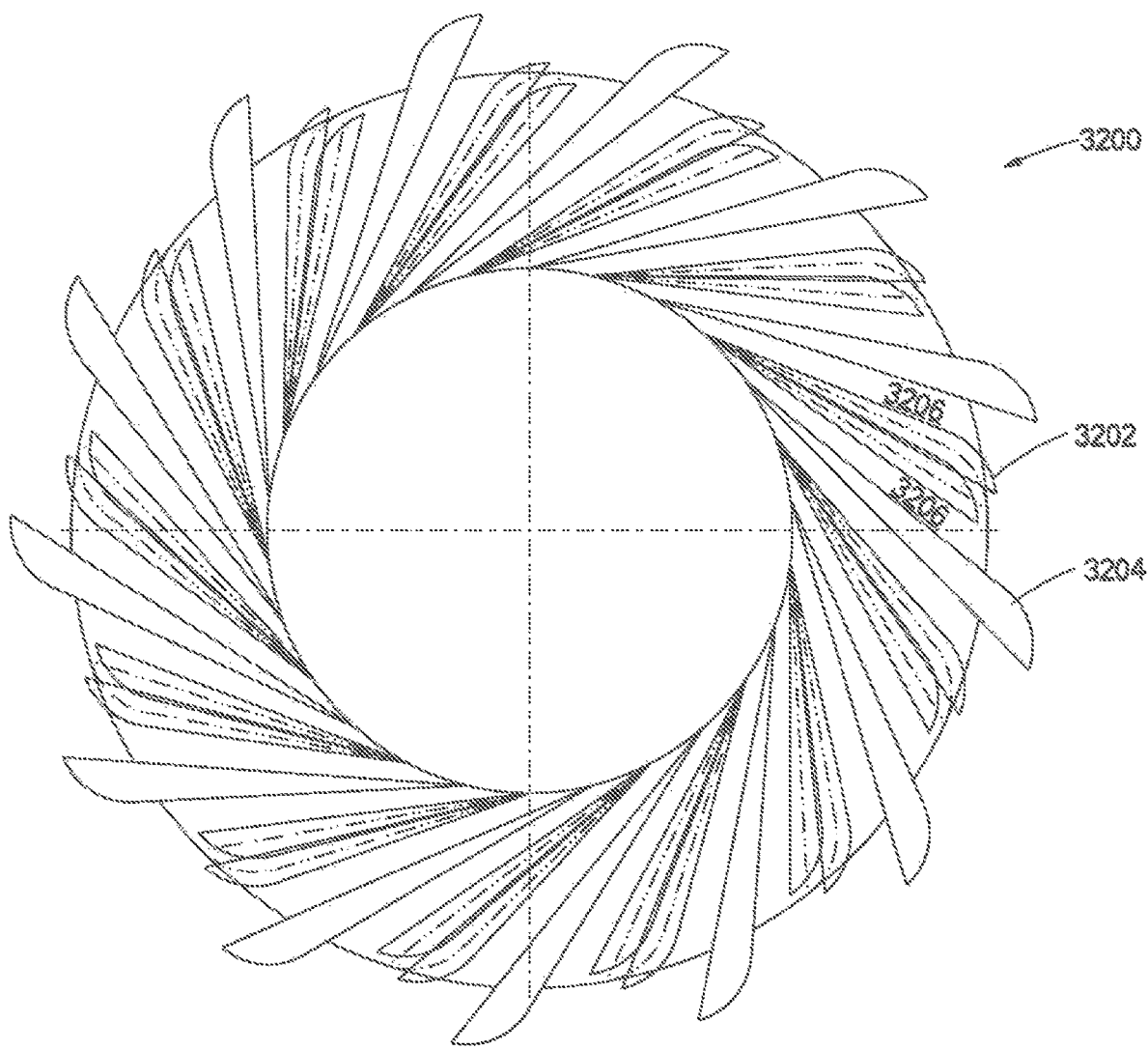
FIG. 32 shows a channel diffuser having a row of vanes that include first and second vanes, the first vanes having an alternate stagger angle.
Figure 33:
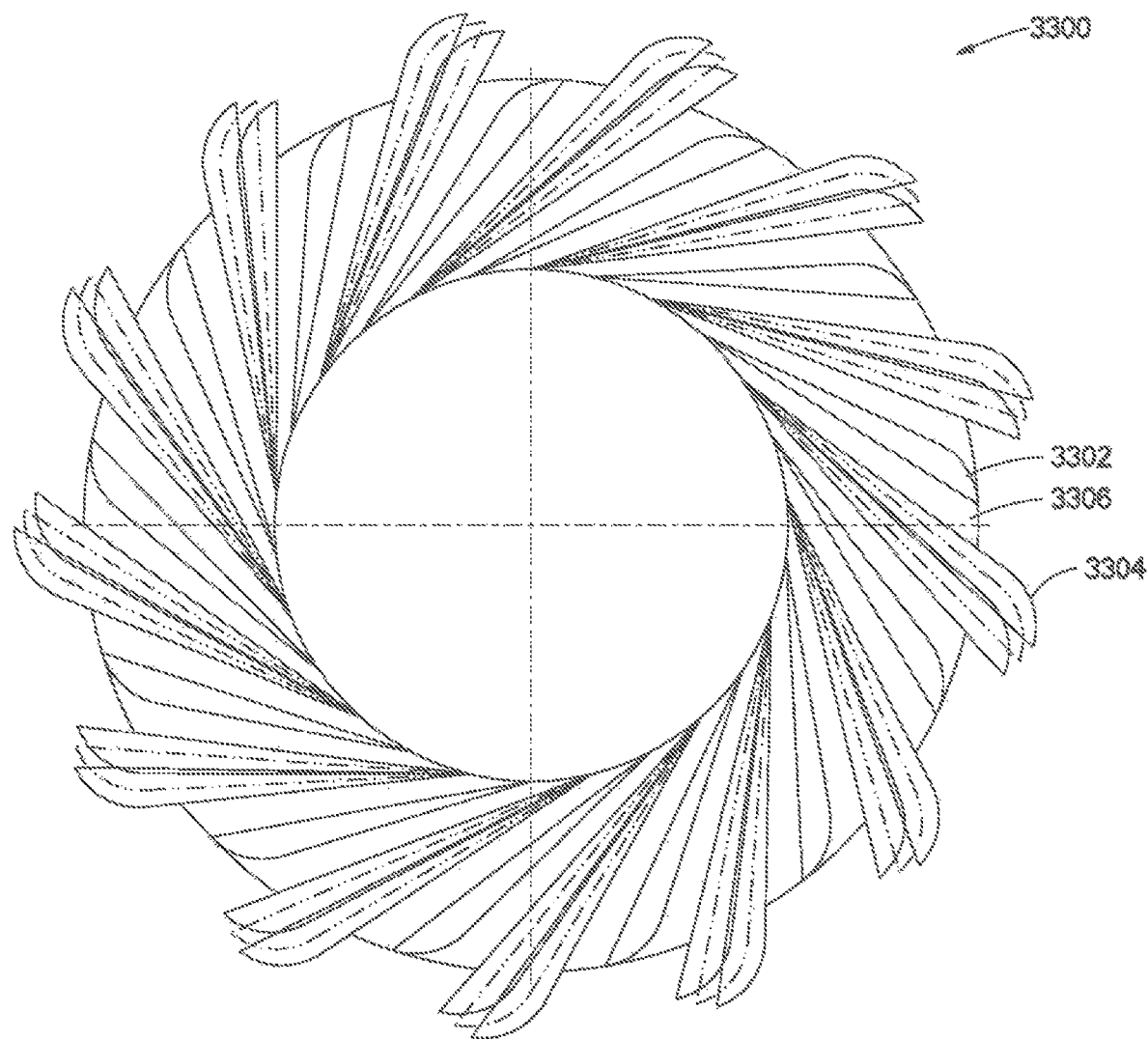
FIG. 33 shows a channel diffuser having a row of vanes that include first and second vanes, the second vanes having an alternate stagger angle.

FIG. 32 shows an exemplary channel diffuser 3200 which is substantially the same as diffuser 3000 (FIG. 30) with equivalent components having the same name and same reference numeral suffix. Unlike diffuser 3000, where the wedge angle, vane stagger, and channel divergence angles of first and second vanes 3002, 3004 are the same, the stagger angle of first vane 3202 and associated channel diverge angles of adjacent passages 3206 may be varied in either direction from a stagger angle of second vanes 3204. In some examples, the stagger angle of less than all of first vanes 3202 may be different than other ones of the first vanes, thereby resulting in an aperiodic arrangement and one or more biased passages 3206. FIG. 33 shows diffuser 3300, which is substantially the same as diffuser 3200, except that rather than varying the stagger angle of first vanes 3302, the stagger angle of one or more second vanes 3304 and associated channel divergence angles of adjacent passages 3306 may be varied. In some examples, the stagger angle of less than all of second vanes 3304 may be varied, resulting in diffuser 3300 having one or more aperiodic sections having one or more biased passages. In other examples, any one or more of the vane characteristic variations illustrated in FIGS. 22-33 may be combined in any combination.

Figure 34:
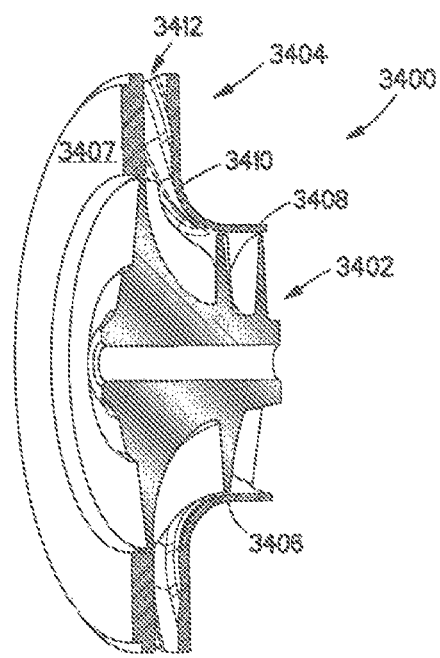
FIG. 34 shows a turbomachine having a diffuser and a shroud with flowwise grooves.
Figure 35:
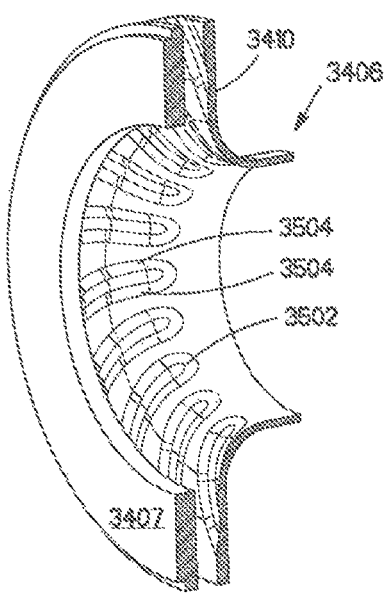
FIG. 35 is another view of the diffuser and shroud of FIG. 34.
Figure 36:
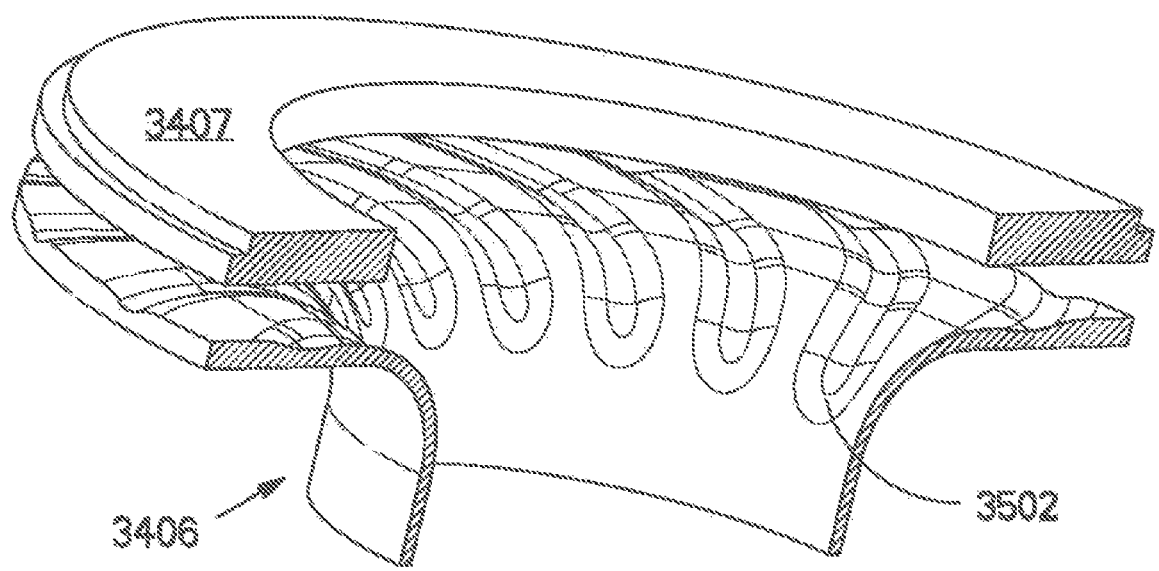
FIG. 36 is another view of the diffuser and shroud of FIGS. 34 and 35.
Figure 37:
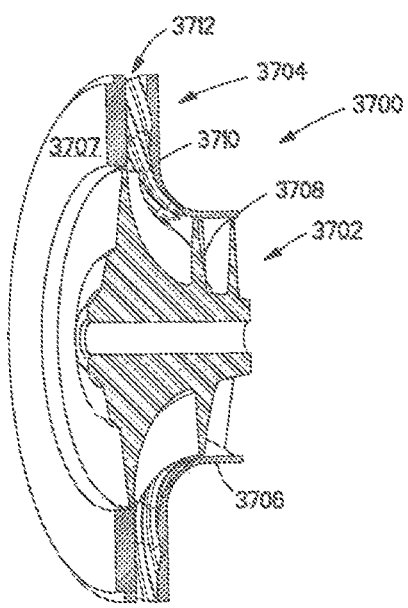
FIG. 37 shows a turbomachine having a diffuser and a shroud with flowwise grooves.
Figure 38:
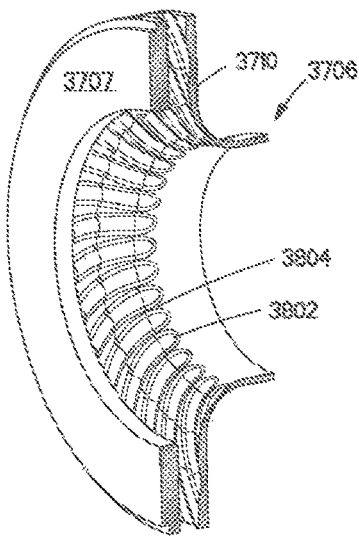
FIG. 38 is another view of the diffuser and shroud of FIG. 37.
Figure 39:
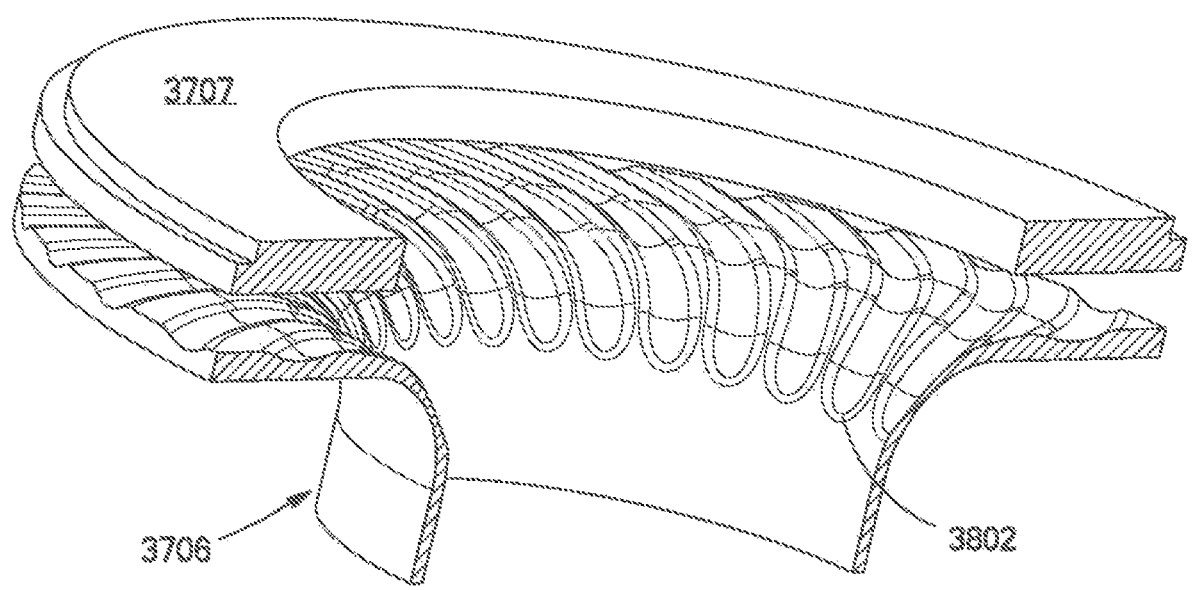
FIG. 39 is another view of the diffuser and shroud of FIGS. 37 and 38.

FIG. 34 is an isometric view of a turbomachine 3400, including impeller 3402 and vaneless diffuser 3404. Diffuser 3404 extends between shroud 3406 and hub 3407. Shroud 3406 extends from an impeller inlet 3408, across an impeller exit/diffuser inlet 3410 to diffuser outlet 3412. FIGS. 35 and 36 are additional views of shroud 3406 and hub 3407. As shown in FIGS. 35 and 36, exemplary shroud 3406 includes a plurality of flowwise grooves 3502 (only one labeled) that extend in a flowwise direction from a location upstream of diffuser inlet and adjacent impeller 3402, to a location downstream of the diffuser inlet, in this example to diffuser outlet 3412 (FIG. 34). Flowwise grooves 3502 are located in the surface of shroud 3406 and have rounded edges 3504, giving the shroud wall a circumferential profile that approximates a periodic waveform. Exemplary grooves 3502 may be designed and configured to guide a portion of fluid flow in impeller 3402 into diffuser 3404 at a preferred angle, thereby increasing the performance of turbomachine 3400. FIGS. 37-39 show turbomachine 3700, which is substantially the same as turbomachine 3400 with equivalent components having the same name and same reference numeral suffix. Unlike turbomachine 3400, turbomachine 3700 has flowwise grooves 3802 that are more closely spaced than flowwise grooves 3502 (FIG. 35), with edges 3804 of adjacent grooves 3802 substantially touching at a leading edge region of the grooves.

Figure 40:
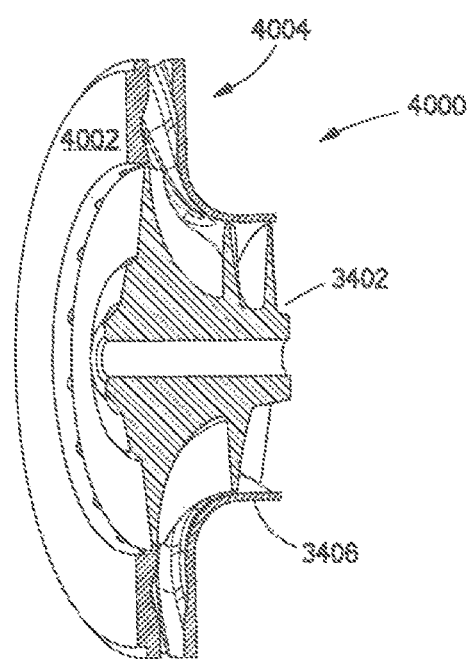
FIG. 40 shows a turbomachine having a diffuser and a shroud with flowwise grooves in the hub and shroud.
Figure 41:
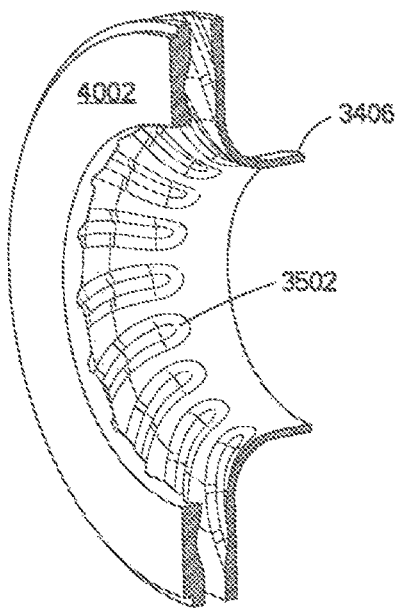
FIG. 41 is another view of the diffuser and shroud of FIG. 40.
Figure 42:
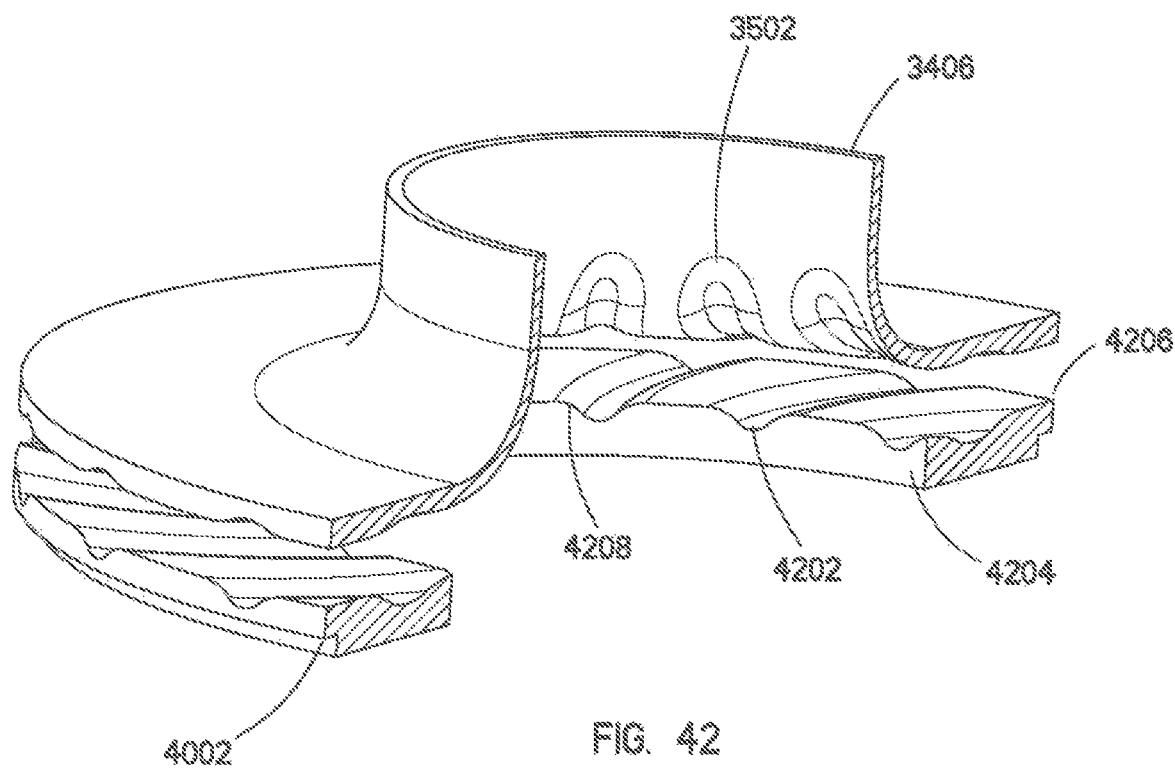
FIG. 42 is another view of the diffuser and shroud of FIGS. 40 and 41.
Figure 43:
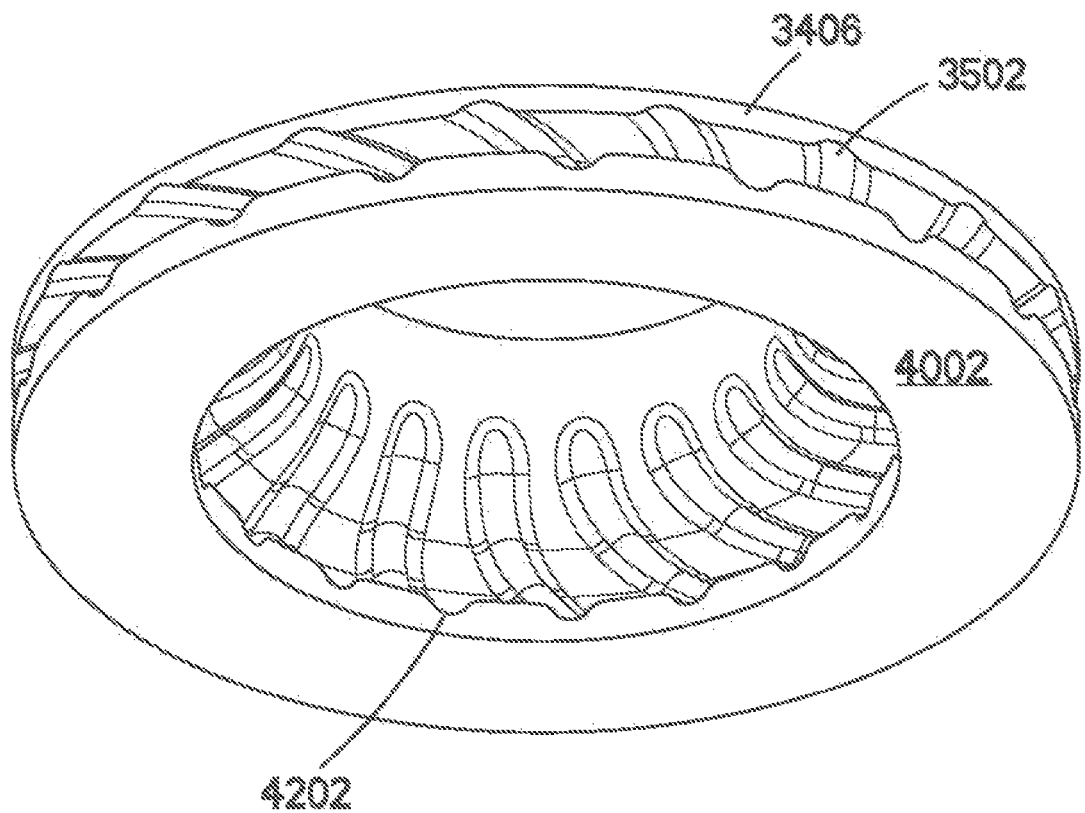
FIG. 43 shows the hub and shroud of FIGS. 40-42 with the hub clocked relative to the shroud.
Figure 44:
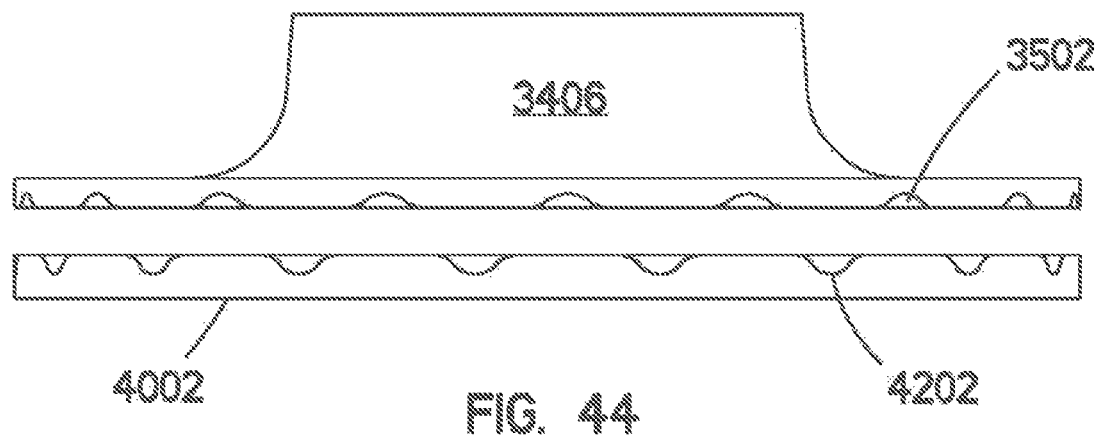
FIG. 44 is an elevation view of the clocked hub and shroud of FIG. 43.

FIGS. 40-42 show an exemplary turbomachine 4000, which has the same impeller 3402 and shroud 3406 as turbomachine 3400 (FIGS. 34-36), but an alternative hub 4002, that, as can be best seen in FIG. 42, also has flowwise grooves that extend in a flowwise direction, in this example, from diffuser inlet 4204 to diffuser outlet 4206. In the example shown, diffuser 4004 has the same number of grooves 4202 as grooves 3502 in shroud 3406, and similarly has grooves with rounded edges 4208. Grooves 4202 are circumferentially aligned with grooves 3502. As with grooves 3502, hub-side grooves 4202 may be designed and configured to guide a portion of working fluid in a preferred direction to improve the performance of diffuser 4004. FIGS. 43 and 44 show an alternate configuration from FIGS. 40-42, wherein a circumferential location of hub-side grooves 4202 are clocked with respect to shroud-side grooves 3502. In this example, each of hub-side grooves 4202 are aligned with a midpoint between adjacent shroud-side grooves 3502. In other examples, any other relative circumferential positioning may be used.

Figure 45:
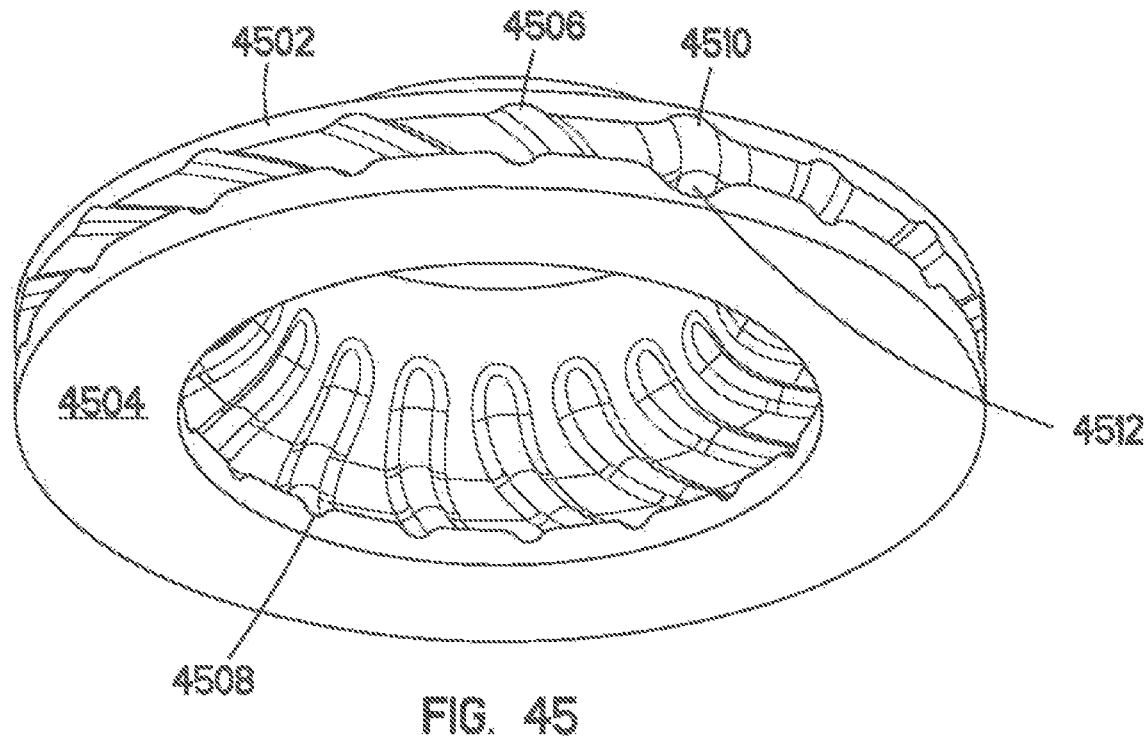
FIG. 45 shows a diffuser having a hub and shroud with flowwise recesses and one set of recesses having a different characteristic than the other recesses, resulting in a biased passage.
Figure 46:
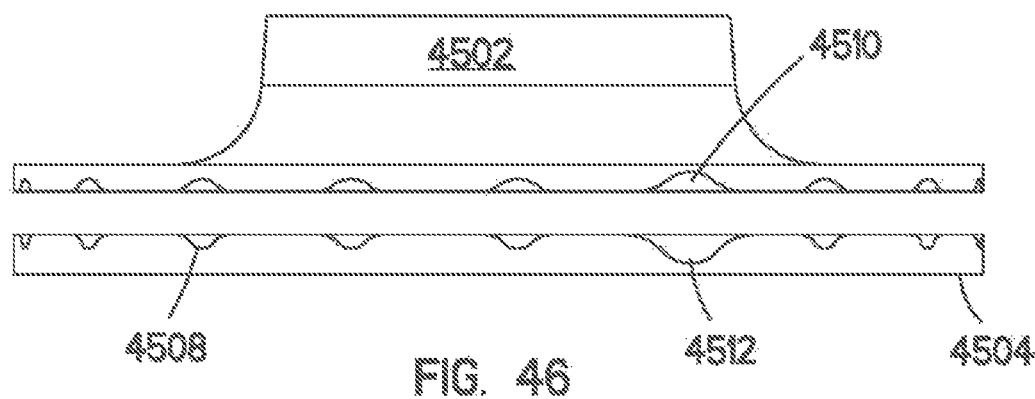
FIG. 46 is an elevation view of the diffuser of FIG. 45.

FIGS. 45 and 46 show an exemplary shroud 4502 and hub 4504, each having flowwise grooves 4506 and 4508, respectively. Unlike the embodiments shown in FIGS. 40-44, shroud 4502 and hub 4504 also include biased passages 4510, 4512, in the form of enlarged flowwise grooves that have a larger cross-sectional area than grooves 4506, 4508. Such biased passages may be located, configured, and dimensioned to bias a circumferential pressure distribution toward circumferential uniformity, and/or provide other performance enhancements described herein. In other examples, one or both of shroud 4502 and hub 4504 may have additional biased flowwise grooves, or one or more biased flowwise grooves may be located in only the shroud or hub. The examples shown in FIGS. 45 and 46 include a periodic portion of passageways in the form of flowwise grooves and an aperiodic portion, in the illustrated example, having one biased passageway.

Figure 47:
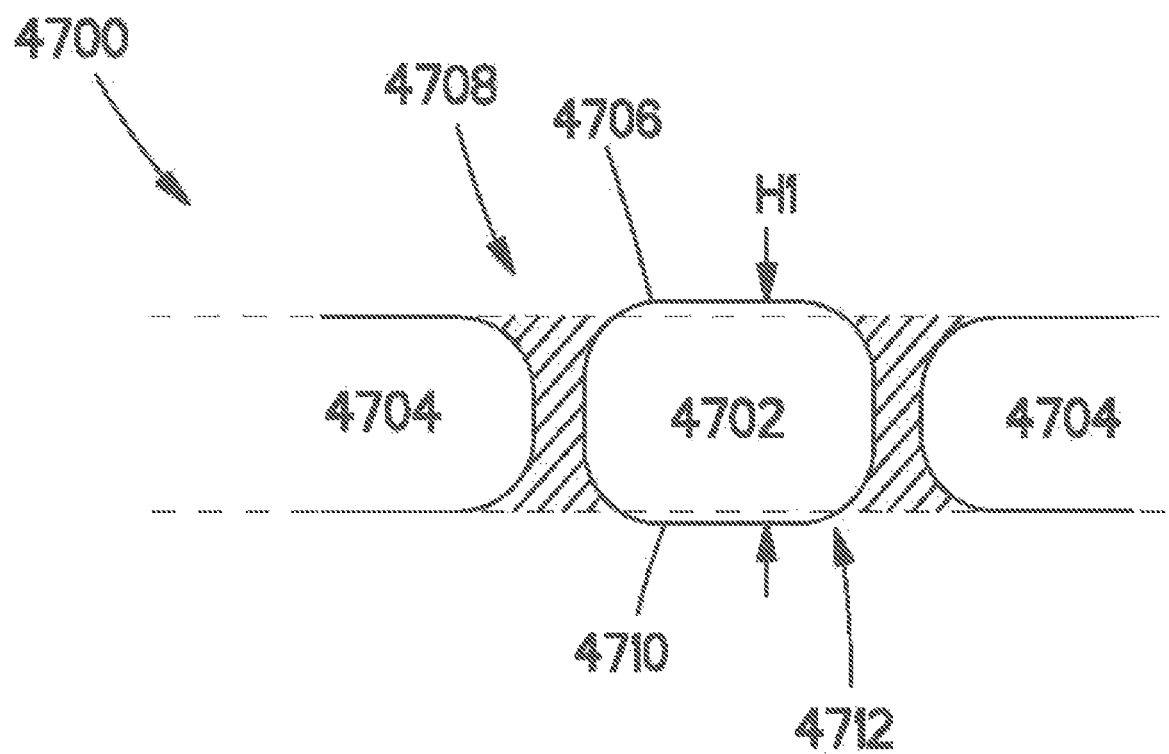
FIG. 47 is a cross-sectional view of a diffuser passage, the cross section taken at a location downstream of a leading edge of the passage and showing recesses in the hub and shroud surfaces of the passage, thereby providing a biased passage.

FIG. 47 is a cross-sectional elevation view of a biased diffuser passage 4702 disposed between passages 4704. Biased passage 4702 has an increased passage height H1 from recesses 4706 located in shroud 4708 and recess 4710 located in shroud 4712. Recesses 4706 and 4710 may be similar in shape and location to grooves 3502 (FIG. 35), 4202 (FIG. 42), or may have other configurations, e.g., different leading and/or trailing edge location, width, flowwise length, etc. For example, in some embodiments, recesses 4706 and 4710 may have a leading edge located at a diffuser inlet. In the example shown in FIG. 47, only one recess 4706, 4710 is located in the hub and shroud 4708, 4712, thereby creating an aperiodic portion having a biased passage with a larger cross-sectional area than other passages in diffuser 4700. In other examples a plurality of diffuser passages may have an increased height from one or more recesses located in the hub and/or shroud.

Figure 48:
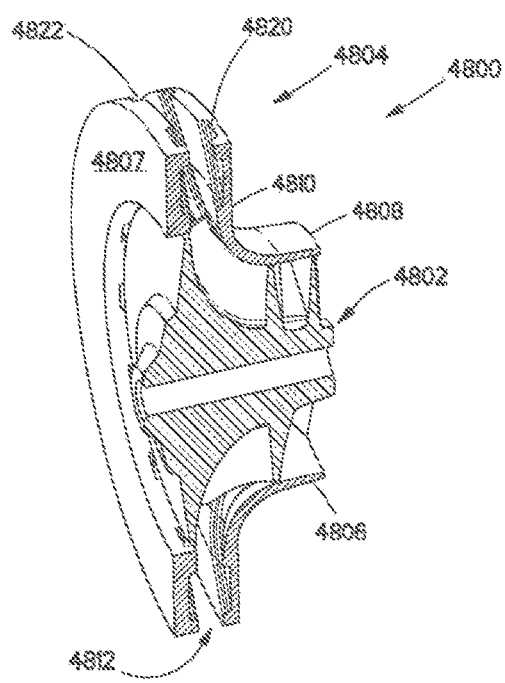
FIG. 48 shows a turbomachine having a diffuser and a shroud with flowwise channels in the hub and shroud.
Figure 49:
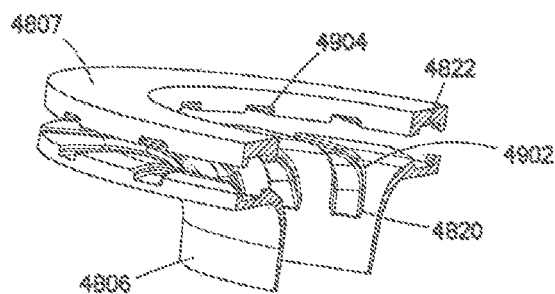
FIG. 49 is another view of the diffuser of FIG. 48.

FIG. 48 is an isometric view of a turbomachine 4800, including impeller 4802 and vaneless diffuser 4804. Diffuser 4804 extends between shroud 4806 and hub 4807. Shroud 4806 extends from an impeller inlet 4808, across an impeller exit/diffuser inlet 4810 to diffuser outlet 4812. FIG. 49 is an additional view of shroud 4806 and hub 4807. As shown in FIGS. 48 and 49, exemplary shroud 4806 and hub 4807 each include a plurality of flowwise channels 4820, 4822, respectively (only one of each labeled) that extend in a flowwise direction. Channels 4820, 4822 as well as flowwise grooves 3502 (FIG. 35), 3802 (FIG. 38), and 4202 (FIG. 42) are all flowwise elongate recesses. Channels 4820 and 4822 differ from grooves 3502, 3802, 4202, by the cross-sectional shape of the recess, with the channels having a substantially square edge 4902 (FIG. 49) and the grooves having a rounded edge 3504 (FIG. 35). Shroud surface channels 4820 extend from a location upstream of diffuser inlet 4810 and adjacent impeller 4802, to a location downstream of the diffuser inlet, in this example to diffuser outlet 4812. Hub surface channels 4822 extend across the entire length of hub 4807 from diffuser inlet 4810 to diffuser outlet 4812. Flowwise channels 4820 are located in the surface of shroud 4806 and have substantially square edges 4902 giving the shroud wall a circumferential profile that approximates a periodic square waveform. Similarly, flowwise channels 4822 are located in the surface of hub 4807 and have substantially square edges 4904 giving the hub wall a circumferential profile that approximates a periodic square waveform. Exemplary channels 4820 and 4822 may be designed and configured to guide a portion of fluid flow in impeller 4802 into diffuser 4804 at a preferred angle, thereby increasing the performance of turbomachine 4800. In other embodiments, the characteristics of one or both of channels 4820, 4822 may be varied, such as a depth, width, and number of channels. In the example shown in FIGS. 48 and 49, channels 4820 and 4822 are circumferentially aligned, however, in other examples, the relative positions may be clocked such that the hub and shroud channels are not aligned.

Figure 50:
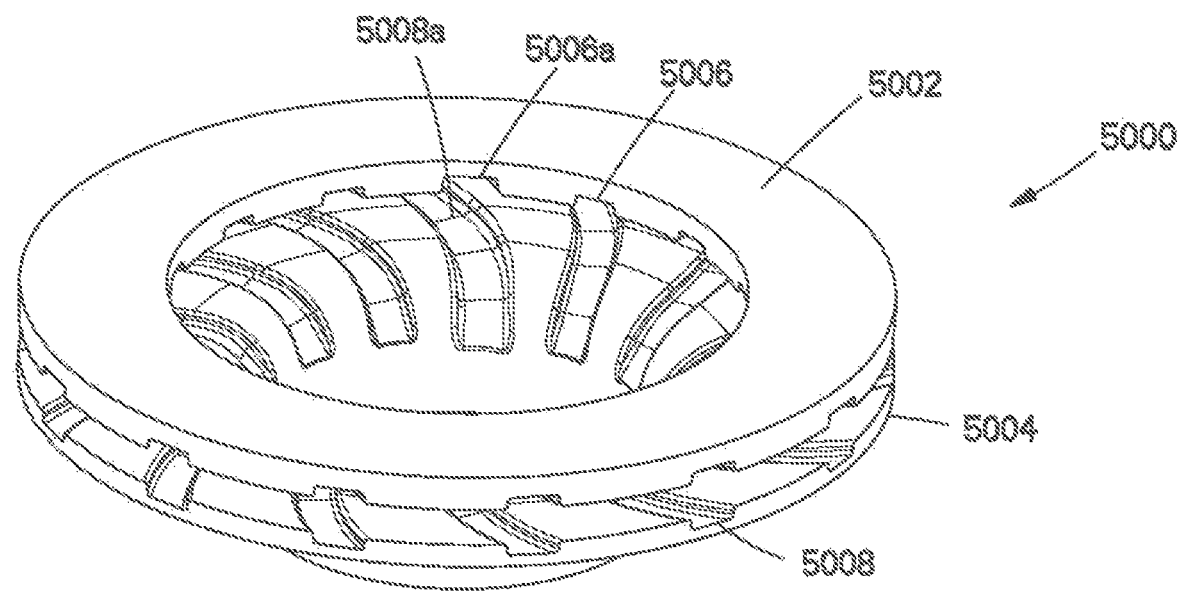
FIG. 50 shows a turbomachine having a diffuser with flowwise channels in the hub and shroud, one of the channels having a different characteristic than other ones of the channels, resulting in a biased passage.
Figure 51:
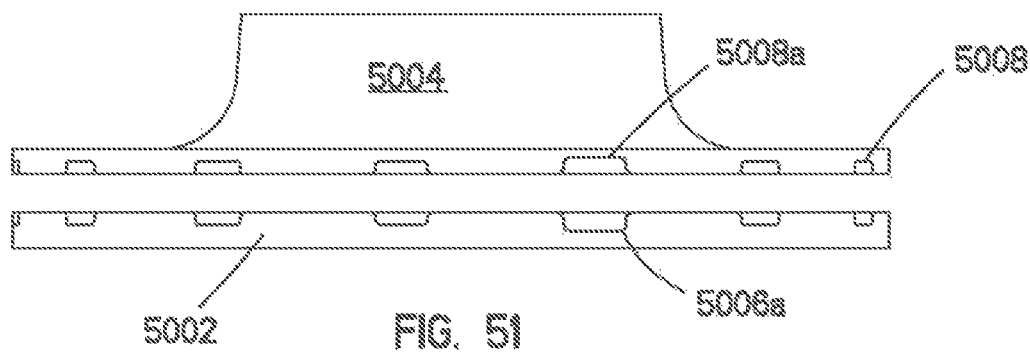
FIG. 51 is an elevation view of the diffuser of FIG. 50.

FIGS. 50 and 51 show an alternative diffuser 5000 that is similar to diffuser 4804 (FIG. 48) and includes hub 5002 and shroud 5004 having hub flowwise channels 5006 and shroud flowwise channels 5008. Unlike diffuser 4804, one of each of channels 5006 and 5008 have a characteristic that is different than the other channels 5006, 5008, here, a channel 5006*a* and 5008*a* each having an enlarged depth, resulting in a biased passage. In other examples, a characteristic of just hub channels 5006 or just shroud channels 5008 may be varied from other ones of the hub and shroud channels to create a biased passage. In some examples, characteristics other than depth may be varied, such as cross-sectional shape (e.g., groove versus channel), width, length, leading edge location, and trailing edge location). In some examples, more than one of hub and/or shroud channels 5006, 5008 may be varied to create a larger aperiodic section having more than one biased passage, or more than one aperiodic section. In yet other examples, diffusers made in accordance with the present disclosure may have a smaller number of flowwise recesses located at select circumferential locations, rather than a plurality of flowwise recesses equally spaced around the entire circumference of the machine. For example, diffusers made in accordance with the present disclosure may have only one, two, three, etc. flowwise recesses located in select locations around the circumference of the machine.

Figure 52:
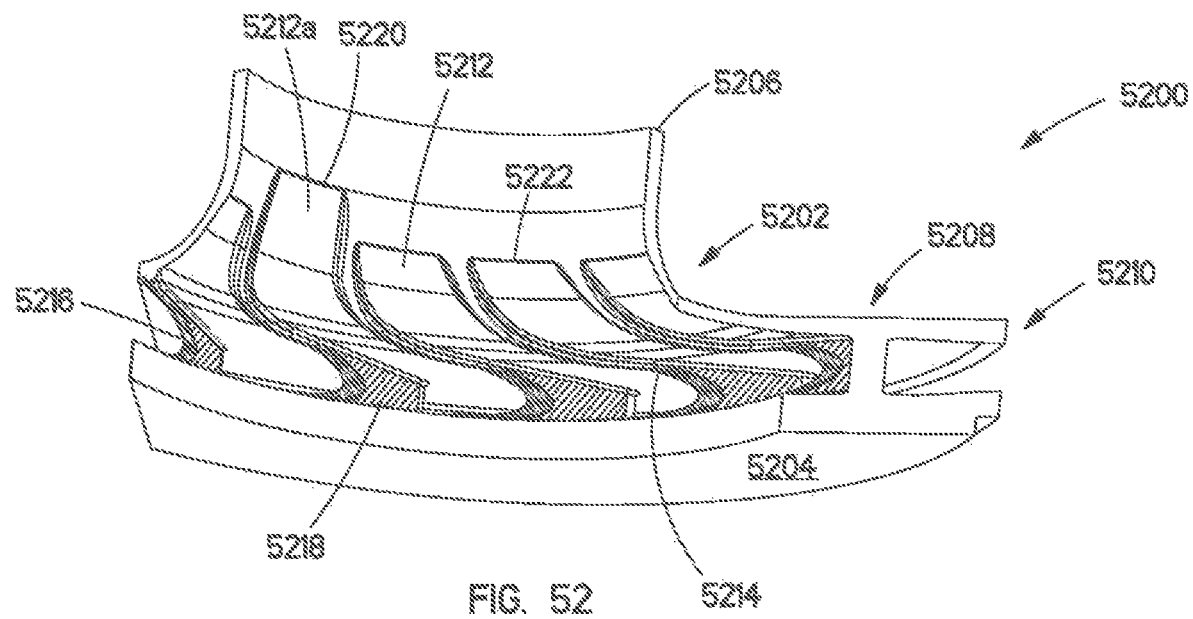
FIG. 52 shows a vaned diffuser having flowwise channels in a shroud surface, one of the channels being a biased passage.
Figure 53:
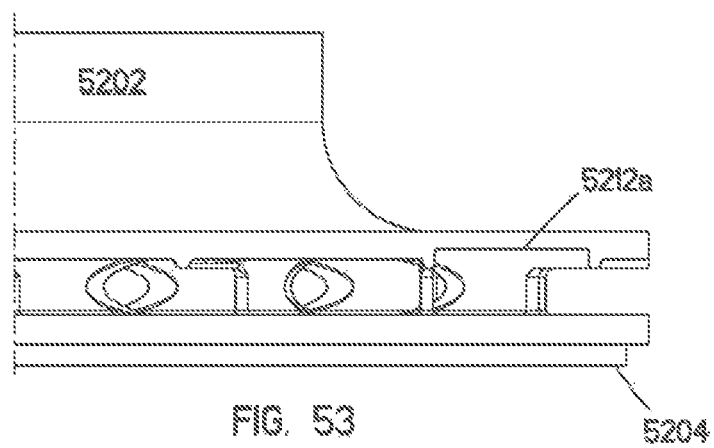
FIG. 53 is an elevation view of the diffuser of FIG. 52.

FIGS. 52 and 53 show an exemplary vaned diffuser 5200 having a shroud 5202 and hub 5204, the shroud extending from an impeller inlet 5206, across a diffuser inlet 5208 to a diffuser exit 5210. Shroud 5202 includes flowwise channels 5212 extending to locations upstream and downstream of diffuser inlet 5208 and are separated by upper legs 5214 of a leading edge 5216 of vanes 5218. In the illustrated example, leading edges 5216 have a scalloped, also referred to herein as a swallowtail shape. In the illustrated example, hub 5204 does not include any flowwise recesses. In other examples, hub 5204 may include flowwise recesses, such as channels or grooves.

As shown in FIGS. 52 and 53, a biased channel 5212*a* has a different characteristic than the other channels 5212, here, a leading edge location 5220 that is farther upstream than a leading edge location 5222 of channels 5212 (best seen in FIG. 52) and a depth that is greater than a depth of channels 5212 (best seen in FIG. 53). Biased channel 5212*a* creates a biased passage in a aperiodic section of diffuser 5200.

The foregoing has been a detailed description of illustrative embodiments of the invention. It is noted that in the present specification and claims appended hereto, conjunctive language such as is used in the phrases "at least one of X, Y and Z" and "one or more of X, Y, and Z," unless specifically stated or indicated otherwise, shall be taken to mean that each item in the conjunctive list can be present in any number exclusive of every other item in the list or in any number in combination with any or all other item(s) in the conjunctive list, each of which may also be present in any number. Applying this general rule, the conjunctive phrases in the foregoing examples in which the conjunctive list consists of X, Y, and Z shall each encompass: one or more of X; one or more of Y; one or more of Z; one or more of X and one or more of Y; one or more of Y and one or more of Z; one or more of X and one or more of Z; and one or more of X, one or more of Y and one or more of Z.

Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve aspects of the present disclosure. Accordingly, this description is meant to be taken only by way of example, and not to otherwise limit the scope of this invention.

Further alternative exemplary embodiments of the present invention are described in the paragraphs below.

In one example, a diffuser for a turbomachine includes a plurality of diffuser passages located around a circumference of the diffuser for receiving a flow field having a circumferential pressure distribution; the diffuser passages include at least one periodic section and at least one aperiodic section, the at least one aperiodic section including at least one biased passage that is located, configured, and dimensioned to bias the circumferential pressure distribution toward circumferential uniformity. Such an exemplary embodiment may also include one or more of the following features:

The plurality of diffuser passages have a first spatial frequency, the circumferential pressure distribution including a time averaged low frequency component that has a lower spatial frequency than the first spatial frequency, the at least one biased passage configured to bias the low frequency component toward a circumferentially uniform pressure distribution.

The at least one periodic section includes a plurality of first vanes and the at least one biased passage includes at least one second vane, the first and second vanes each having a plurality of vane characteristics including one or more of a leading edge located at a leading edge location, a trailing edge located at a trailing edge location, a radial distance from a diffuser centerline, a chord length, a maximum thickness, a height, a flowwise shape distribution, a stagger angle, vane pitch, vane wedge angle, vane lean, vane twist, vane leading edge shape, and channel divergence angle, at least one of the plurality of vane characteristics of the at least one second vane is different from at least one of the plurality of vane characteristics of the plurality of first vanes.

The at least one of the plurality of second vane characteristics that are different from the first vane characteristics include differences in any of the plurality of vane characteristics in any combination.

The leading edge of the at least one second vane is located at a different radial distance from the diffuser centerline than the leading edges of the plurality of first vanes.

The trailing edge of the at least one second vane is located at a different radial distance from the diffuser centerline than the trailing edges of the plurality of first vanes.

The at least one second vane is located at a different radial distance from the diffuser centerline than the first vanes.

The second vane chord length is different than the first vane chord length.

The second vane maximum thickness is different than the first vane maximum thickness.

The second vane height is different than the first vane height.

The diffuser includes hub and shroud surfaces, the plurality of diffuser passages extending between the hub and shroud surfaces, the second vane is a partial height vane affixed to either the hub or shroud surface.

The second vane flowwise shape distribution is different than the first vane flowwise shape distribution.

The second vane stagger angle is different than the first vane stagger angle.

The at least one biased passage is blocked.

The stagger angle of the at least one second vane is fixed.

The stagger angle of the at least one second vane is adjustable.

The second vane pitch is different than the first vane pitch.

The plurality of diffuser passages each have a passage height, the passage height of the at least one biased passage being different than the passage height of the diffuser passages in the periodic section.

The diffuser includes a hub surface, a shroud surface, and a flowwise recess located in at least one of the hub and shroud surfaces, the flowwise recess extending upstream of and aligned with the at least one biased passage.

The diffuser includes a hub surface, a shroud surface, and at least one elongate flowwise recess located in at least one of the hub and shroud surfaces.

The diffuser includes a plurality of elongate flowwise recesses, the plurality of elongate flowwise recesses having an aperiodic arrangement around the circumference of the diffuser.

The circumferential pressure distribution does not originate from an asymmetric flow path located upstream or downstream of the diffuser.

The circumferential pressure distribution does not originate from an asymmetric flow path located upstream or downstream of the diffuser, the asymmetric flow path selected from the group consisting of a side inlet, an asymmetric collector, and a volute.

The at least one biased passage is not located in a volute distortion zone proximate a volute tongue or proximate a location 180 degrees from the volute distortion zone.

The diffuser is configured for use in a centrifugal compressor or pump, the at least one biased passage is configured and dimensioned to limit or reduce a variation in a magnitude of the circumferential pressure distribution so as to improve a stage efficiency by more than 0.2 percentage points, to cause a more uniform impeller exit flow distribution, to improve a maximum through-flow at a given speed by more than 0.1%, to reduce a surge line by more than 0.2%, or to reduce vibratory stress levels on an impeller or diffuser vanes by more than 0.2%.

The diffuser is configured for use in a centrifugal compressor or pump, the periodic section having a spatial frequency and the circumferential pressure distribution having a primary spatial frequency that is less than the spatial frequency of the periodic section, the at least one biased passage is configured and dimensioned to reduce a maximum variation in a magnitude of the circumferential pressure distribution over a design operating range of the compressor or pump by more than 1%.

The diffuser is configured for use in a centrifugal compressor or pump having an impeller configured to generate a pressure rise, the periodic section having a spatial frequency and the circumferential pressure distribution having a primary spatial frequency that is less than the spatial frequency of the periodic section, the at least one biased passage is configured and dimensioned to limit a maximum variation in a magnitude of the circumferential pressure distribution over a design operating range of the compressor or pump to less than 30% of an impeller pressure rise.

The first and second vanes are located in the same row.

In another example, a diffuser including a plurality of first vanes arranged in a row around a portion of a circumference of the diffuser, each of the first vanes spaced a first circumferential distance from an adjacent first vane; and at least one second vane located between ones of the first vanes, the at least one second vane having a different characteristic than the first vanes, the different characteristic resulting in a biased passage proximate the at least one second vane for biasing a circumferential pressure distribution of a flow field entering the diffuser toward a circumferentially uniform pressure distribution. Such an exemplary embodiment may also include one or more of the following features:

The different characteristic is selected from the group consisting of a radial distance of a leading or trailing edge from a diffuser centerline, a radial distance from a diffuser centerline, a chord length, a maximum thickness, a height, a flowwise shape distribution, a stagger angle, vane pitch, vane wedge angle, vane lean, vane twist, vane leading edge shape, and channel divergence angle.

The plurality of first vanes have a spatial frequency, the biased diffuser passage being configured to bias a time averaged circumferential pressure distribution having a low frequency component that has a lower spatial frequency than the first vane spatial frequency, the biased passage configured to bias the low frequency component toward a circumferentially uniform pressure distribution.

In another example, a diffuser includes a hub and a shroud; a plurality of first vanes extending from the hub to the shroud and arranged in a row around a portion of a circumference of the diffuser; and at least one second vane located between ones of the first vanes, the at least one second vane extending from the hub to the shroud and having a different characteristic than the first vanes. Such an exemplary embodiment may also include one or more of the following features:

The different characteristic is selected from the group consisting of a radial distance of a leading or trailing edge from a diffuser centerline, a radial distance from a diffuser centerline, a chord length, a maximum thickness, a height, a flowwise shape distribution, a stagger angle, vane pitch, vane wedge angle, vane lean, vane twist, vane leading edge shape, and channel divergence angle.

In yet another example, a diffuser includes a hub and a shroud; and a plurality of vane groupings each including at least two vanes, each of the at least two vanes having a different characteristic than other ones of the at least two vanes. Such an exemplary embodiment may also include one or more of the following features:

The diffuser has a circumference, the vane groupings located around the circumference of the diffuser in a periodic arrangement.

The at least two vanes are partial-height vanes, one of the at least two vanes affixed to the shroud and a second one of the at least two vanes affixed to the hub.

A height of the at least two vanes are not the same.

In still another example, a method of designing a diffuser having an inlet and a plurality of vanes to reduce a circumferential pressure variation proximate the inlet, the pressure variation having a primary spatial frequency that is less than a spatial frequency of the vanes. The method includes providing a plurality of diffuser passages each having an inlet and located around a circumference of the diffuser; and locating at least one biased diffuser passage between ones of the plurality of diffuser passages, the biased diffuser passage having a different cross-sectional area than the plurality of diffuser passages for minimizing the circumferential pressure variation at the inlets of the plurality of diffuser passages.

In another example, a method of designing a diffuser including developing a computational model of an axisymmetric diffuser; calculating a performance of the diffuser when a circumferential pressure distribution having a time averaged low-frequency circumferential variation is present at an inlet to the diffuser; modifying the computational model to add at least one biased flow passage to the diffuser; calculating a performance of the modified diffuser; and comparing the diffuser performance from the two calculating steps to determine if the biased flow passage improved diffuser performance.

In a further example, a method of designing a diffuser including measuring a circumferential pressure distribution at an inlet to a first diffuser having periodic diffuser passages; replacing the first diffuser with a second diffuser having at least one aperiodic section with at least one biased diffuser passage; measuring a circumferential pressure distribution at an inlet to the second diffuser; and comparing the pressure distributions from the two measuring steps to determine whether the second diffuser reduced an undesired variation in a magnitude of the measured circumferential pressure distribution by a predetermined amount. Such an exemplary embodiment may also include one or more of the following features:

calculating a performance of the first diffuser;
calculating a performance of the second diffuser; and
comparing the performance from the two calculating steps to determine whether the second diffuser improved diffuser performance by a predetermined amount.

In another example, a vaneless diffuser including an inlet and an exit; a hub surface and a shroud surface each extending between the inlet and the exit; and a plurality of flowwise recesses in at least one of the hub and shroud surfaces, the plurality of recess being aperiodic. Such an exemplary embodiment may also include one or more of the following features:

The plurality of flowwise recesses include one or more first flowwise recesses and one or more second flowwise recesses, the one or more second flowwise recesses having at least one characteristic that is different than the first flowwise recesses.

The at least one characteristic that is different is selected from the group consisting of a length, width, leading edge location, trailing edge location, depth, and cross-sectional shape.

In another example, a diffuser for a turbomachine, including a plurality of diffuser passages located around a circumference of the diffuser for receiving a flow field, the flow field has a circumferential pressure distribution; the diffuser passages include a first set of passages each having a first effective cross-sectional area distribution along a flow-wise direction and at least one biased passage having a second effective cross-sectional area distribution along the flowwise direction, the first and second effective cross-sectional area distributions being different, the at least one biased passage located, configured, and dimensioned to bias the circumferential pressure distribution toward circumferential uniformity.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A diffuser, comprising:
an inlet, a hub, and a shroud; and
a row of vanes including a plurality of vane groupings each including a plurality of first partial height vanes affixed to one of the hub and the shroud, and a plurality of second partial height vanes circumferentially spaced from the first partial height vane and affixed to the other of the hub and the shroud;

wherein adjacent ones of the first and second partial height vanes overlap in a spanwise direction when viewed from a direction perpendicular to the spanwise direction, the spanwise direction being a direction extending between the hub and the shroud;

wherein the first partial height vanes are affixed to the hub, wherein at least one of the first partial height vanes is upstream of the remaining first partial height vanes, and wherein a height of the at least one of the first partial height vanes is greater than or equal to a height of the remaining partial height vanes.

2. The diffuser of claim 1, wherein a height of one or more of the first partial height vanes or one or more of the second partial height vanes is between 5% and 65% of the passage height.

3. A diffuser, comprising:

an inlet, a hub, and a shroud; and a row of vanes including a plurality of vane groupings each including a plurality of first partial height vanes affixed to one of the hub and the shroud, and a plurality second partial height vanes circumferentially spaced from the first partial height vane and affixed to the other of the hub and the shroud;

wherein adjacent ones of the first and second partial height vanes overlap in a spanwise direction when viewed from a direction perpendicular to the spanwise direction, the spanwise direction being a direction extending between the hub and the shroud;

wherein a height of at least one of the first partial height vanes or at least one of the second partial height vanes is between 5% and 65% of the passage height.

4. The diffuser of claim 3, wherein at least some of the vanes in the row of vanes have differing stagger angles relative to one another.

5. The diffuser of claim 3, wherein the overlap in the spanwise direction between adjacent ones of the first and second partial height vanes is greater than or equal to 10% of the passage height.

6. The diffuser of claim 3, wherein the row of vanes includes at least one full height vane.

7. The diffuser of claim 3, wherein each of the first and second partial height vanes has a leading edge, the leading edges of the first and second partial height vanes being aligned in a flowwise direction.

8. The diffuser of claim 3, wherein the diffuser has an inlet, and at least one of the first and second partial height vanes is located at the inlet.

9. The diffuser of claim 3, wherein the first partial height vanes are affixed to the hub, wherein one or more of the first partial height vanes is upstream of the remaining first partial height vanes, and wherein a height of the one or more of the first partial height vanes is greater than or equal to a height of the remaining partial height vanes.

10. The diffuser of claim 3, wherein the plurality of first partial height vanes are the only partial height vanes affixed to the hub, and the first partial height vanes have leading edges that are aligned in the flowwise direction.

11. The diffuser of claim 3, wherein the height of the at least one of the first partial height vanes or the at least one of the second partial height vanes is between 5% and 15% of the passage height.

12. The diffuser of claim 3, wherein the row of vanes define a plurality of passages each having a height extending in the spanwise direction between the hub and the shroud and extending in a circumferential direction between adjacent ones of the first and second partial height vanes, the plurality of passages including at least one biased passage, a spanwise height of the at least one biased passage being greater than a spanwise height of other ones of the plurality of passages.

13. The diffuser of claim 3, wherein the first and second partial height vanes are positioned in an alternating and repeating spatial arrangement.

14. The diffuser of claim 3, wherein the diffuser is a single row diffuser, the row of vanes being the only row of vanes in the diffuser.

15. The diffuser of claim 3, wherein the hub includes a hub surface and the shroud includes a shroud surface, the diffuser further including at least one elongate flowwise recess located in at least one of the hub and shroud surfaces.

16. The diffuser of claim 15, wherein the at least one elongate flowwise recess includes a plurality of elongate flowwise recesses having an aperiodic arrangement around a circumference of the diffuser.

17. The diffuser of claim 3, wherein the plurality of first and second partial height vanes are stationary and have a fixed spacing between adjacent ones of the first and second partial height vanes.

18. The diffuser of claim 3, wherein the row of vanes is a first row of vanes located downstream of an inlet of the diffuser.

19. The diffuser of claim 3, wherein the row of vanes includes at least one aperiodic section, the at least one aperiodic section including at least one biased passage defined by at least one vane having a different characteristic than the first and second partial height vanes.

* * * * *